(12) United States Patent
Ge et al.

(10) Patent No.: US 8,174,647 B2
(45) Date of Patent: May 8, 2012

(54) TRANSFLECTIVE LIQUID CRYSTAL DISPLAY COMPRISING A DIELECTRIC LAYER BETWEEN THE FIRST AND SECOND ELECTRODES IN THE TRANSMISSIVE REGION

(75) Inventors: Zhibing Ge, Orlando, FL (US); Xinyu Zhu, Orlando, FL (US); Thomas Xinzhang Wu, Orlando, FL (US); Shin-Tson Wu, Orlando, FL (US); Wang-Yang Li, Tainan County (TW); Chung-Kuang Wei, Taipei (TW)

(73) Assignees: Chimei Innolux Corporation, Miaoli County (TW); University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 12/899,792

(22) Filed: Oct. 7, 2010

(65) Prior Publication Data
US 2011/0019137 A1    Jan. 27, 2011

Related U.S. Application Data

(62) Division of application No. 11/678,691, filed on Feb. 26, 2007, now abandoned.

(51) Int. Cl.
*G02F 1/1335* (2006.01)
(52) U.S. Cl. .......................................................... 349/114
(58) Field of Classification Search .................... 349/114
See application file for complete search history.

(56) References Cited

U.S. PATENT DOCUMENTS

| | | | |
|---|---|---|---|
| 5,986,730 A | 11/1999 | Hansen et al. | |
| 6,341,002 B1 | 1/2002 | Shimizu et al. | |
| 6,977,702 B2 | 12/2005 | Wu | |
| 7,015,997 B2 | 3/2006 | Choi et al. | |
| 2002/0036730 A1 | 3/2002 | Baek et al. | 349/106 |
| 2003/0048395 A1* | 3/2003 | Yasui | 349/43 |
| 2003/0095217 A1* | 5/2003 | Sakamoto et al. | 349/106 |
| 2003/0210369 A1 | 11/2003 | Wu | 349/114 |
| 2004/0218123 A1 | 11/2004 | Park et al. | 349/114 |
| 2005/0122450 A1 | 6/2005 | Kang | 349/114 |
| 2006/0103792 A1* | 5/2006 | Lee et al. | 349/113 |
| 2006/0187371 A1* | 8/2006 | Nakayoshi et al. | 349/38 |

OTHER PUBLICATIONS

S. Pancharatnam, "Achromatic Combinations of Birefringent Plates: Part I, An Achromatic Circular Polarizer," in Proceedings of the Indian Academy of Sciences, vol. 41, sec. A, 1955, pp. 130-136.

X. Zhu et al, "Analytical Solutions for Uniaxial-Film-Compensated Wide-View Liquid Crystal Displays," Journal of Display Technology, vol. 2, No. 1, pp. 2-20, Mar. 2006.

* cited by examiner

*Primary Examiner* — Mark Robinson
*Assistant Examiner* — Dennis Y. Kim
(74) *Attorney, Agent, or Firm* — Fish & Richardson P.C.

(57) ABSTRACT

A display includes a plurality of pixel circuits, each pixel circuit including a first electrode, a second electrode, a reflective region, and a transmissive region. The reflective region reflects ambient light and includes a first portion of a liquid crystal layer and a polarization dependent reflector. The transmissive region transmits backlight and includes a second portion of the liquid crystal layer. A dielectric layer is between the first and second electrodes in one of the reflective region and the transmissive region, the dielectric layer configured such that when a pixel voltage is applied to the first and second electrodes, the percentage of the pixel voltage applied across the first portion of the liquid crystal layer is different from the percentage of the pixel voltage applied across the second portion of the liquid crystal layer. The display includes a backlight module to generate the backlight.

19 Claims, 19 Drawing Sheets

TRANSFLECTIVE LIQUID CRYSTAL DISPLAY COMPRISING A DIELECTRIC LAYER BETWEEN THE FIRST AND SECOND ELECTRODES IN THE TRANSMISSIVE REGION

This application is a divisional of and claims the benefit of priority from U.S. application Ser. No. 11/678,691, filed Feb. 26, 2007 now abandoned, incorporated here by reference in its entirety.

BACKGROUND OF THE INVENTION

The description relates to transflective liquid crystal displays.

Liquid crystal displays (LCD) include transmissive type, reflective type, and transflective type displays. A transmissive type LCD includes a backlight module to generate light that is modulated by liquid crystal cells to generate images. The transmissive type LCD can have a high contrast ratio and good color saturation. A reflective type LCD includes a reflector to reflect ambient light that is modulated by liquid crystal cells to generate images. The reflective type LCD does not require a backlight module, and is useful in environments with strong ambient light. A transflective type LCD can operate in a transmissive mode and/or a reflective mode. In one example, each pixel of the transflective LCD is divided into a transmissive part (T sub-pixel) and a reflective part (R sub-pixel). When operating in the transmissive mode, a backlight module generates light that is modulated by the T sub-pixels. When operating in the reflective mode, reflected ambient light is modulated by the R sub-pixels.

SUMMARY

In one general aspect, a transflective liquid crystal display achieves good gray scale gamma curve match between transmissive and reflective modes by using an internal wire grid polarizer and a voltage shield capacitor in one of the transmissive or reflective sub-pixels depending on the liquid crystal mode. In some examples, the display does not use broadband circular polarizers, and can have wide viewing angles and high contrast ratios (e.g., a contrast ratio greater than 100:1 at 40 degree viewing angle for most directions).

In another general aspect, a display includes a plurality of pixel circuits, each pixel circuit including a first electrode, a second electrode, a reflective region, and a transmissive region. The reflective region reflects ambient light and includes a first portion of a liquid crystal layer between the first and second electrodes, and a polarization dependent reflector that transmits light having a first polarization and reflects light having a second polarization. The transmissive region transmits backlight and includes a second portion of the liquid crystal layer between the first and second electrodes. A dielectric layer is between the first and second electrodes in one of the reflective region and the transmissive region, the dielectric layer configured such that when a pixel voltage is applied to the first and second electrodes, the percentage of the pixel voltage applied across the first portion of the liquid crystal layer is different from the percentage of the pixel voltage applied across the second portion of the liquid crystal layer. The display includes a backlight module to generate the backlight.

Implementations of the display may include one or more of the following features. The polarization dependent reflector includes a wire grid polarizer. In some examples, the dielectric layer is in the reflective region and configured such that when the pixel voltage is applied to the first and second electrodes, the percentage of the pixel voltage applied across the first portion of the liquid crystal layer is lower than the percentage of the pixel voltage applied across the second portion of the liquid crystal layer. The liquid crystal layer is between two substrates, and the liquid crystal layer includes liquid crystal molecules that are substantially aligned along a direction parallel to the surfaces of the substrates when no voltage is applied to the first and second electrodes. In some examples, the dielectric layer is in the transmissive region and configured such that when the pixel voltage is applied to the first and second electrodes, the percentage of the pixel voltage applied across the first portion of the liquid crystal layer is higher than the percentage of the pixel voltage applied across the second portion of the liquid crystal layer. The liquid crystal layer is between two substrates, and the liquid crystal layer includes liquid crystal molecules that are substantially aligned along a direction normal to the substrates when no voltage is applied to the first and second electrodes.

The dielectric layer has a dielectric constant and a thickness that are selected to reduce a difference between a transmittance of the transmissive region and a reflectance of the reflective region for a given pixel voltage applied to the first and second electrodes. The dielectric layer functions as a capacitor that is connected in series with the liquid crystal layer between the first and second electrodes. The dielectric layer includes at least one of silicon oxide and silicon nitride. At least one of the first electrode and the second electrode includes at least one of indium tin oxide, indium zinc oxide, and gallium zinc oxide. The display includes a first linear polarizer and a second linear polarizer that both extend over the transmissive and reflective regions, the first and second linear polarizers being at different sides of the liquid crystal layer. The first linear polarizer is closer to a viewer than the second linear polarizer, and the polarization dependent reflector has a reflective axis that is perpendicular to a transmission axis of the first linear polarizer. The liquid crystal layer is between two substrates, and the liquid crystal layer includes liquid crystal molecules that are substantially aligned along a direction normal to the substrates when no voltage is applied to the first and second electrodes. In some examples, the liquid crystal layer includes a negative dielectric anisotropic liquid crystal material. In some examples, the liquid crystal layer includes a positive dielectric anisotropic liquid crystal material.

In another general aspect, a display includes a first substrate, a second substrate, and pixel circuits between the first and second substrates. Each pixel circuit has a transmissive portion and a reflective portion. Each pixel circuit includes a first electrode, a second electrode, a liquid crystal cell, a polarization dependent reflector located at the reflective portion, and a shield capacitor located at one of the reflective and transmissive portions and positioned in series with the liquid crystal cell.

Implementations of the display may include one or more of the following features. The shield capacitor is configured to cause a gray scale gamma curve of the transmissive region to more closely match a gray scale gamma curve of the reflective region, as compared to the pixel circuit without the shield capacitor. In some examples, the pixel circuits are in dark states when no pixel voltage is applied to the pixel circuits. In some examples, the pixel circuits are in bright states when no pixel voltage is applied to the pixel circuits.

In another general aspect, a transflective display includes a first linear polarizer having a first transmission axis, a second linear polarizer having a second transmission axis, the first linear polarizer located closer to a front side of the display than the second linear polarizer, and pixel circuits. Each pixel circuit includes a liquid crystal layer between the first and second linear polarizers, the liquid crystal layer having a first portion and a second portion, the first portion corresponding to a reflective portion of the pixel circuit, the second portion corresponding to a transmissive portion of the pixel circuit. Each pixel circuit includes a storage capacitor to store an electric charge corresponding to a pixel voltage and a polarization dependent reflector that is associated with the first portion of the liquid crystal layer. The polarization dependent reflector reflects a first component of external light and transmits a second component of the external light, the first component having a first polarization substantially perpendicular to the first transmission axis and the second component having a second polarization substantially parallel to the first transmission axis. Each pixel circuit includes means for applying a first percentage of the pixel voltage to the first portion of the liquid crystal layer and a second percentage of the pixel voltage to the second portion of the liquid crystal layer, the first percentage being different from the second percentage.

Implementations of the transflective display may include one or more of the following features. The means for applying the first and second percentages of the pixel voltage is configured to cause the transmissive portion to have a transmittance-voltage characteristic that more closely matches a reflectance-voltage characteristic of the reflective portion, as compared to a pixel circuit that applies the same percentage of the pixel voltage to the first and second portions of the liquid crystal layer.

In another general aspect, a method includes reflecting external light having a first polarization after the external light passes a liquid crystal layer in a reflective region of a pixel of a display, the reflected light being directed toward a viewer of the display. The method includes transmitting external light having a second polarization after the external light passes the liquid crystal layer in the reflective region, the transmitted light being directed away from the viewer, and transmitting backlight through the liquid crystal layer in a transmissive region of the pixel, the transmitted light being directed toward the viewer. The method includes applying a first percentage of a pixel voltage to the liquid crystal layer in the reflective region, and applying a second percentage of the pixel voltage to the liquid crystal layer in the transmissive region, the second percentage being different from the first percentage.

Implementations of the method may include one or more of the following features. The first and second percentages are configured to cause the transmittance of the transmissive region to more closely match the reflectance of the reflective region for a given pixel voltage, as compared to applying a same percentage of the pixel voltage to the reflective and transmissive regions. In some examples, the method includes showing a dark state at the pixel when the pixel voltage is below a threshold. In some examples, the method includes showing a bright state at the pixel when the pixel voltage is below a threshold. In some examples, the method includes aligning liquid crystal molecules of the liquid crystal layer along directions substantially normal to surfaces of two substrates when no voltage is applied to the first and second electrodes, the liquid crystal layer being positioned between the two substrates. In some examples, the method includes aligning liquid crystal molecules of the liquid crystal layer along directions substantially parallel to surfaces of two substrates when no voltage is applied to the first and second electrodes, the liquid crystal layer being positioned between the two substrates.

In another general aspect, a method includes forming a polarization dependent reflector in a first region of first substrate, the first region corresponding to a reflective region of a pixel of a display, forming a first electrode on the first substrate, and forming a second electrode on a second substrate. The method includes forming a dielectric layer on a portion of the first electrode or a portion of the second electrode, the dielectric layer corresponding to either the reflective region of the pixel or a transmissive region of the pixel, and providing a liquid crystal layer between the first and second substrates, the dielectric layer being positioned in series with the liquid crystal layer between the first and second electrodes.

Implementations of the method may include one or more of the following features. In some examples, the method includes providing alignment layers on the first and second substrates to cause the liquid crystal molecules of the liquid crystal layer to substantially align along a direction normal to the surfaces of the substrates when no voltage is applied to the first and second electrodes. In some examples, the method includes providing alignment layers on the first and second substrates to cause the liquid crystal molecules of the liquid crystal layer to substantially align along a direction parallel to the surfaces of the substrates when no voltage is applied to the first and second electrodes. The method includes providing a first linear polarizer at a side of the first substrate facing away from the liquid crystal layer, and providing a second linear polarizer at a side of the second substrate facing away from the liquid crystal layer, the first linear polarizer having a transmission axis that is non-parallel to a transmission axis of the second linear polarizer.

DETAILED DESCRIPTION

Figure 1:
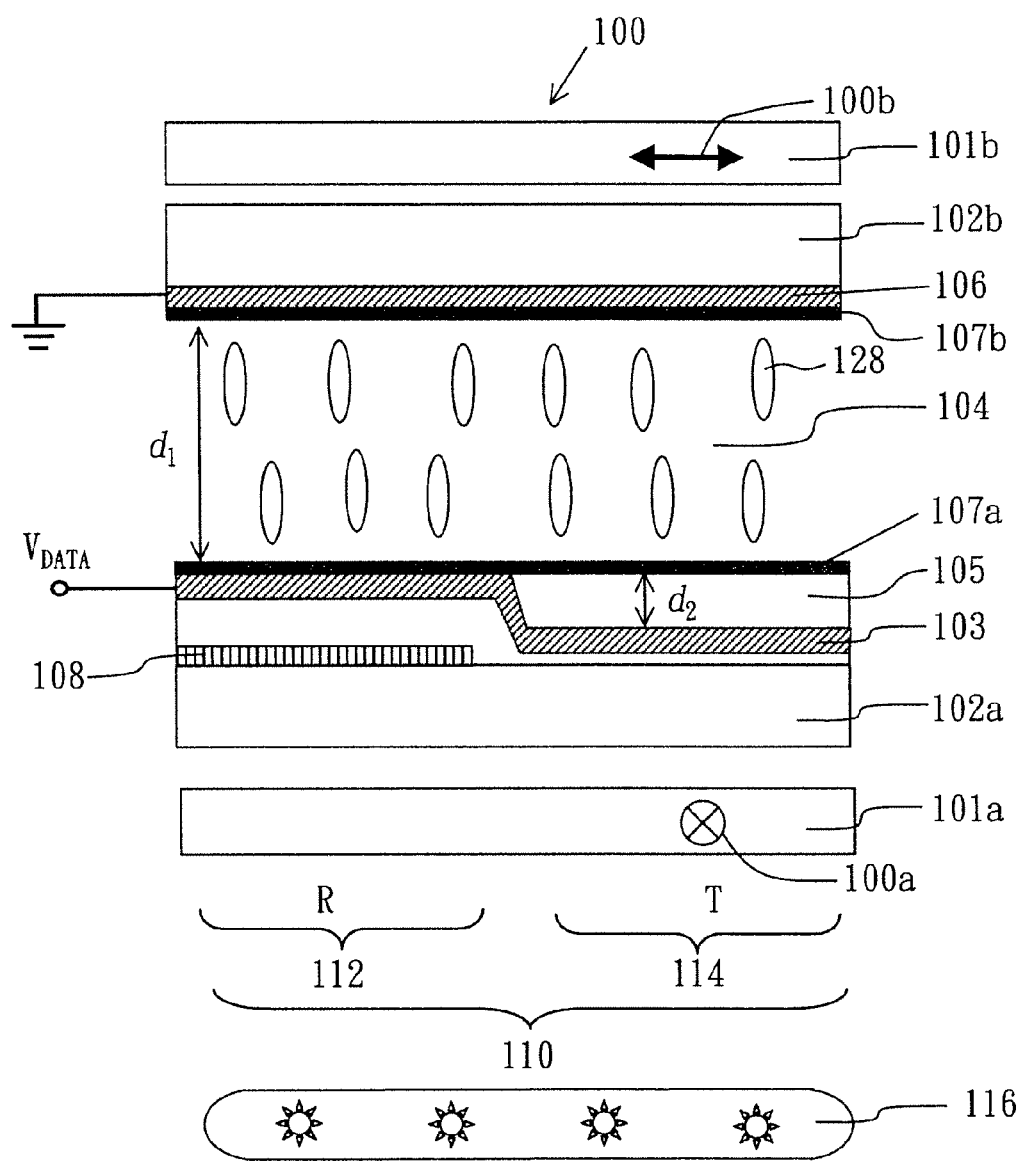
FIG. 1 is a diagram of a transflective liquid crystal display.

FIG. 1 is a cross-sectional diagram of an example of a transflective liquid crystal display 100 that includes a vertically aligned liquid crystal layer 104 positioned between a lower glass substrate 102a and an upper glass substrate 102b. A lower linear polarizer 101a is attached to an outer side of the lower substrate 102a, and an upper linear polarizer 101b is attached to an outer side of the upper substrate 102b. The lower linear polarizer 101a has a transmission axis 100a that is perpendicular to the transmission axis 100b of the upper polarizer 101b. An upper transparent electrode 106 (which functions as a common electrode) and an upper alignment layer 107b are positioned on an inner side of the upper substrate 102b. On an inner side of the lower substrate 102a are a wire grid polarizer 108, passivation layer 105, a lower transparent electrode 103 (which functions as a pixel electrode), and a lower alignment layer 107a. The lower and upper alignment layers 107a and 107b are used to align liquid crystal molecules 128 in the liquid crystal layer 104. A backlight module 116 provides backlight when the display 100 is used in the transmissive mode.

In this description, the terms "upper" and "lower" refer to relative positions of the components of the display 100. An upper layer is closer to the viewer than a lower layer.

The transparent electrodes 103 and 106 can be made of, e.g., indium tin oxide (ITO), indium zinc oxide (IZO), and gallium zinc oxide (GZO). The alignment layers 107a and 107b can be made of, e.g., polyimide materials.

The display 100 includes an array of pixels 110, one of which is shown in FIG. 1. The pixel 110 includes a reflective (R) sub-pixel 112 and a transmissive (T) sub-pixel 114. The wire grid polarizer 108 is a reflective type polarizer or a polarization-dependent reflector, and is located in the R sub-pixel 112. The wire grid polarizer 108 includes metal strips 120 (see FIG. 2) formed on the lower substrate 102a. The metal strips 120 extend along a direction 138 (referred to as the lengthwise direction of the metal strips 120). In this example, the lengthwise direction 138 of the metal strips 120 is perpendicular to the transmission axis 100b of the upper linear polarizer 101b.

The wire grid polarizer 108 has a transmission axis that is perpendicular to the lengthwise direction 138 of the metal strips 120 and a reflection axis that is parallel to the lengthwise direction 138 of the metal strips 120. When an unpolarized incident light 122 (FIG. 2) impinges on the surface of the wire grid polarizer 108, a first component of the light 124 (FIG. 2) having a polarization parallel to the lengthwise direction of the metal strips 120 is reflected, and a second component of the light 126 (FIG. 2) having a polarization perpendicular to the metal strips passes through the wire grid polarizer 108.

Figure 4:
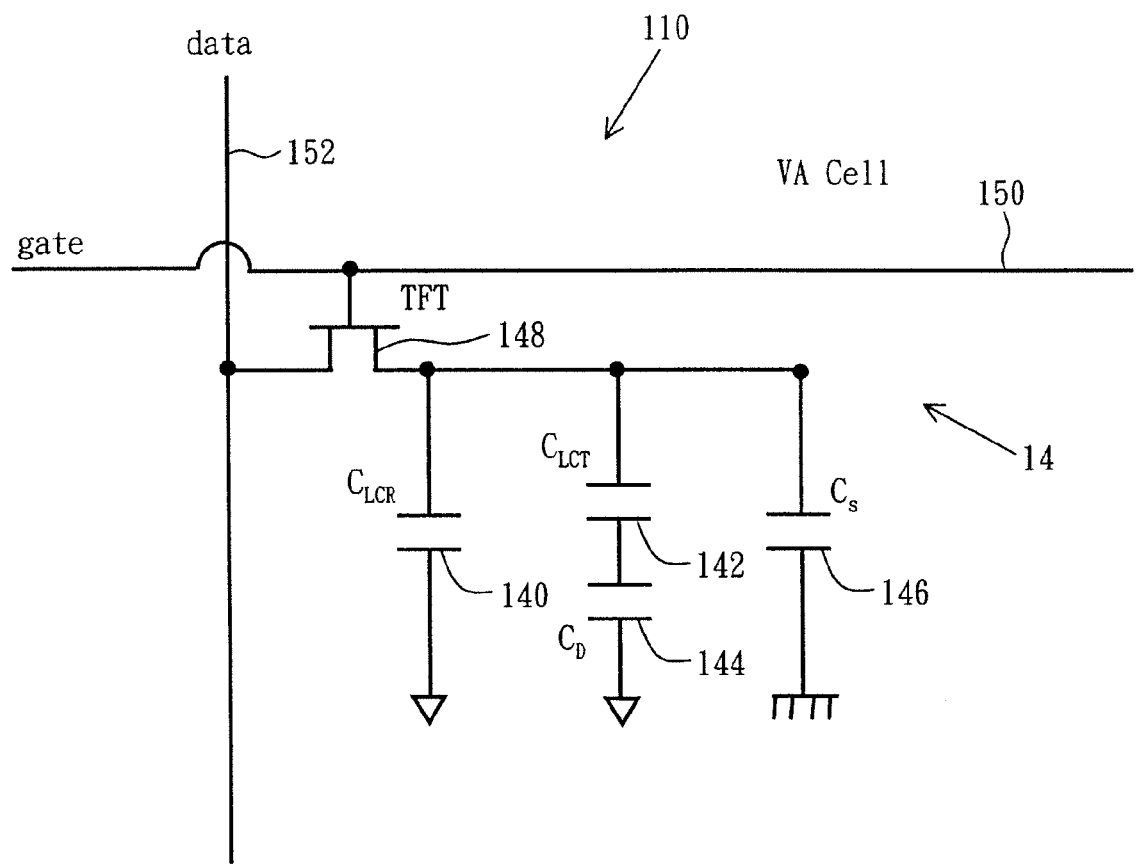
FIG. 4 is a diagram of an equivalent circuit.
Figure 17:
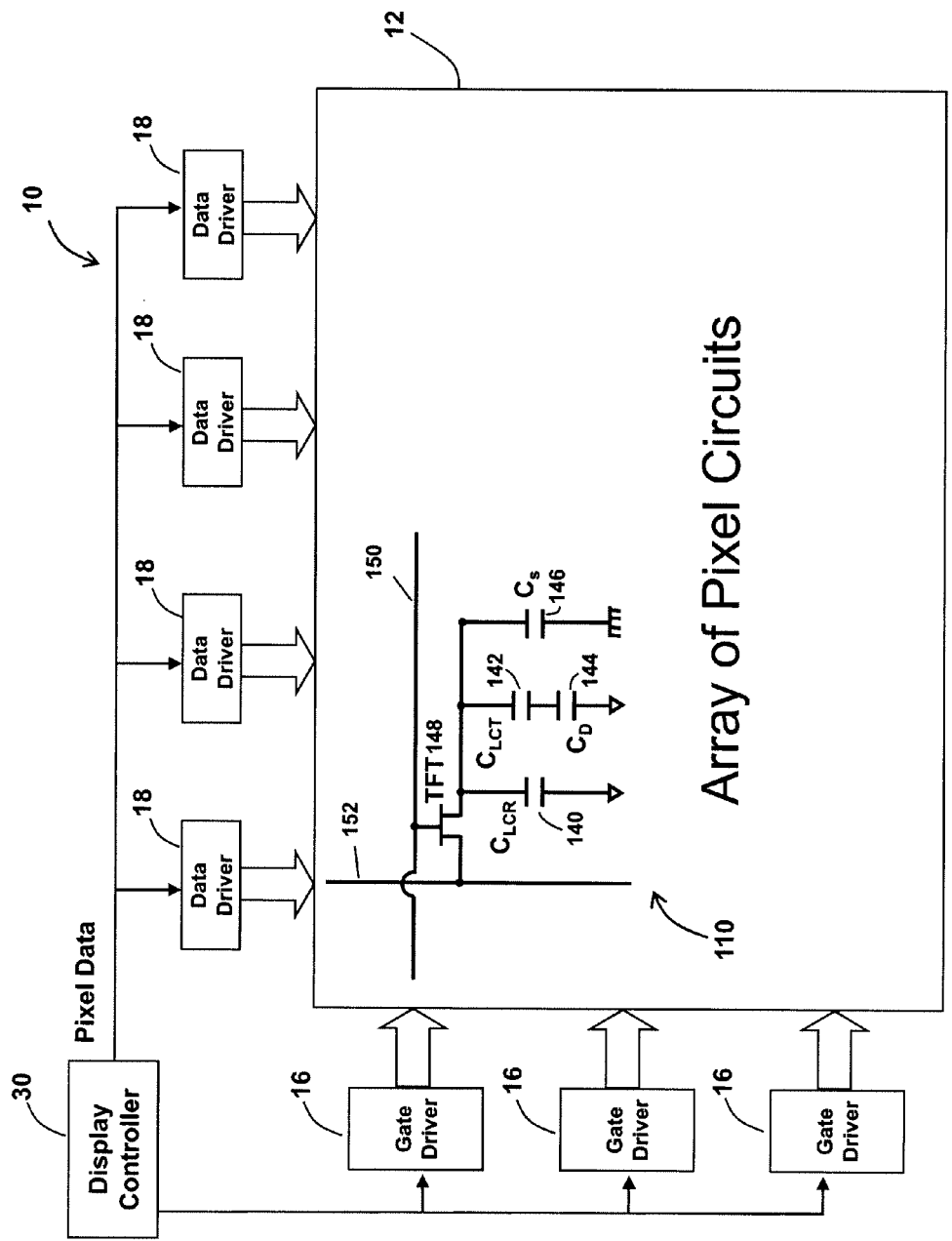
FIG. 17 is a block diagram of a liquid crystal display.

Each pixel 110 includes a storage capacitor $C_S$ (see FIGS. 4 and 17) for storing a pixel voltage, and a thin film transistor (FIGS. 4 and 17) for driving the storage capacitor $C_S$. Within each pixel 110, the thin film transistor, the storage capacitor, the upper electrode 106, the liquid crystal layer 104, the lower electrode 103, the wire grid polarizer 108, and the dielectric layer 105 are collectively referred to as a pixel circuit 14 (FIGS. 4 and 17). The pixel circuits 14 can be individually addressed by using gate lines 150 and data lines 152 (FIGS. 4 and 17). The linear polarizers 101a and 101b, the glass substrates 102a and 102b, the alignment layers 107a and 107b, and the liquid crystal layer 104 extend over several pixels 110.

In the T sub-pixel 114, the passivation layer 105 having a thickness d2 is positioned between the lower transparent ITO electrode 103 and the lower alignment layer 107a. In the R sub-pixel 112, the lower electrode 103 is directly adjacent to the lower alignment layer 107a. When a pixel voltage $V_{DATA}$ is applied to the lower and upper electrodes 103 and 106 (i.e., generating a voltage difference equal to $V_{DATA}$ between the lower and upper electrodes), the percentages of the pixel voltage $V_{DATA}$ applied to the liquid crystal layer 104 in the R and T sub-pixels 112 and 114 are different.

In the R sub-pixel 112, substantially all of the pixel voltage $V_{DATA}$ is applied to the liquid crystal layer 104. In the T sub-pixel 114, the pixel voltage $V_{DATA}$ is applied to both the liquid crystal layer 104 and the passivation layer 105, so the percentage of the pixel voltage $V_{DATA}$ applied to the liquid crystal layer 104 in the T sub-pixel 114 is less than that in the R sub-pixel 112. The passivation layer 105 functions as a shield capacitor that reduces the amount of pixel voltage applied to the liquid crystal layer 104 in the T sub-pixel 114.

Figure 2:
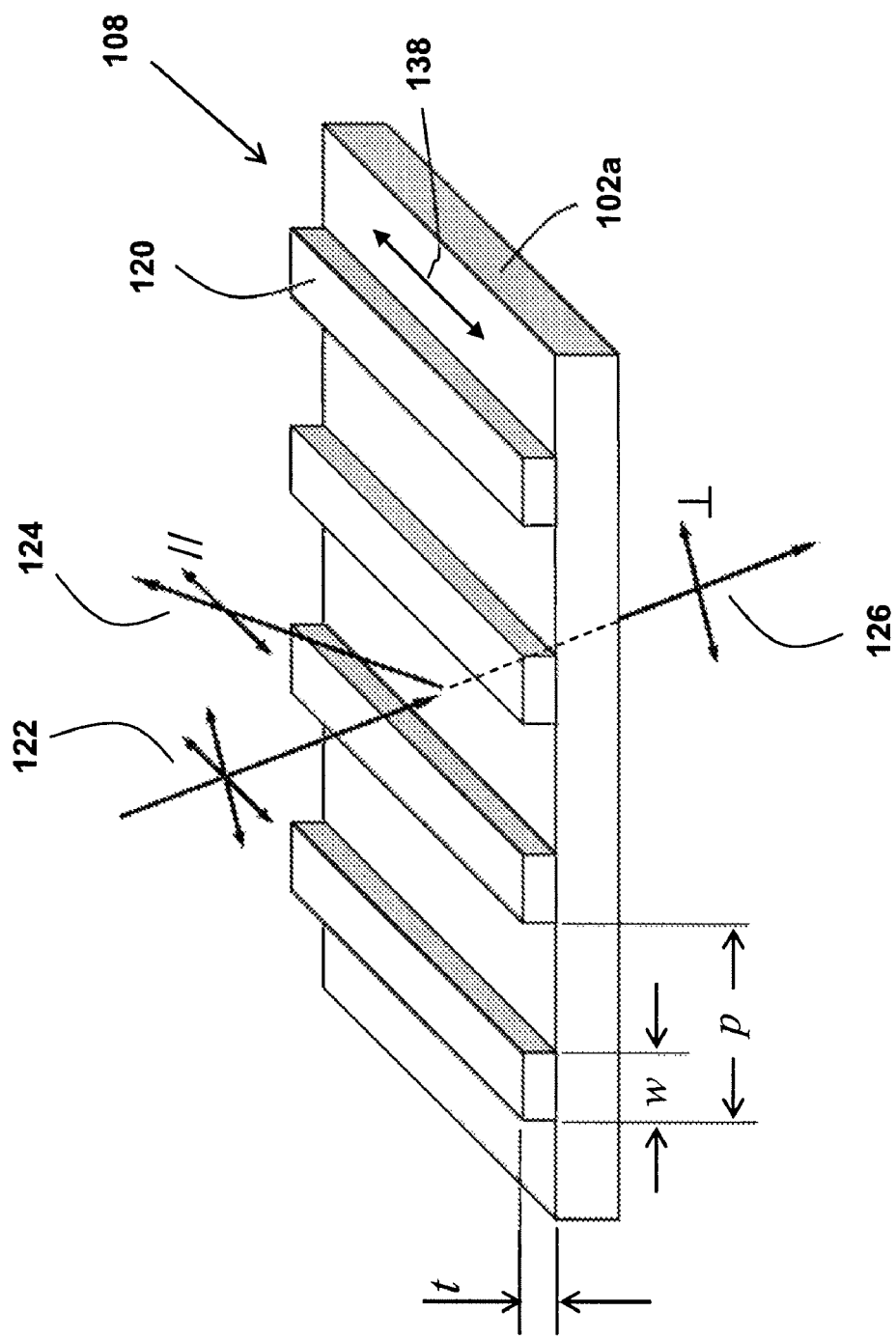
FIG. 2 is a diagram of a wire grid polarizer.

Referring to FIG. 2, the wire grid polarizer 108 includes metal strips 120 aligned in a direction parallel to the transmission axis 100a of the lower polarizer 101a. In some examples, each metal strip 120 has a thickness t and a width w, and the spacing between the metal strips 120 is p. When unpolarized incident light 122 is directed towards the surface of the wire grid polarizer 108, a first component 124 of the light 122 having a polarization parallel to the lengthwise direction of the metal strips 120 is reflected, and a second component 126 of the light 122 having a polarization perpendicular to the lengthwise direction of the metal strips 120 passes through the wire grid polarizer 108.

The following describes operation of the pixel 110 during the dark and bright states. If the display 100 uses gray scale levels ranging from 0 to 255, the dark state corresponds to the gray scale level 0, and the bright state corresponds to the gray scale level 255.

Figure 3A:
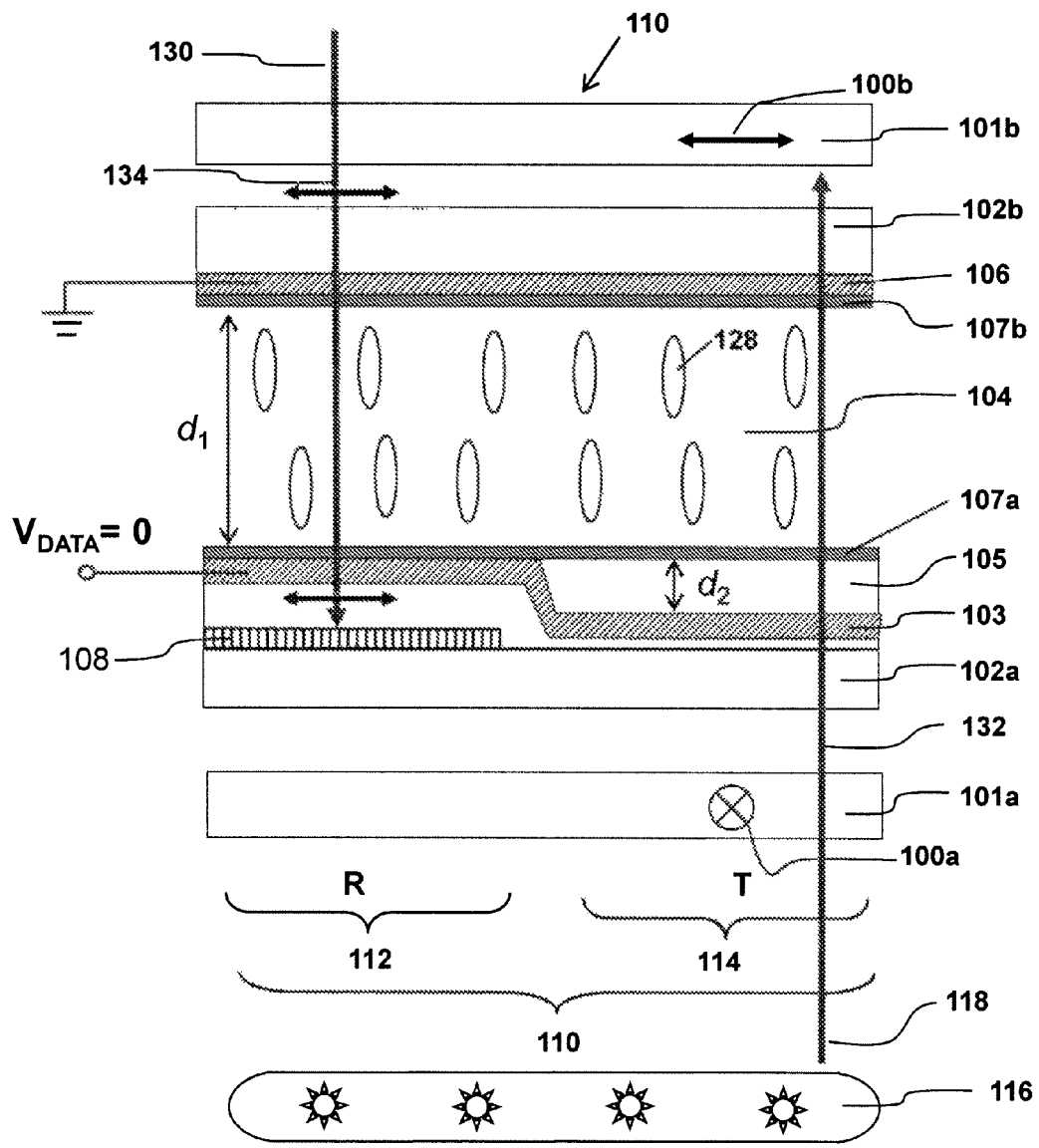
FIGS. 3A and 3B are cross-sectional diagrams of a VA mode transflective liquid crystal display.

Referring to FIG. 3A, when no voltage is applied to the lower and upper electrodes 103 and 106, the liquid crystal molecules 128 are aligned in the vertical direction. In the T sub-pixel 114, backlight 118 from the backlight module 116 passes the lower linear polarizer 101a and becomes linearly polarized light 132 having a polarization direction parallel to the transmission axis 100a of the lower linear polarizer 101a. The linearly polarized light 132 passes the liquid crystal layer 104 without changing its polarization, and is blocked by the upper polarizer 101b.

In the R sub-pixel 112, incident ambient light 130 first passes the upper polarizer 101b and becomes linearly polarized light 134 having a polarization parallel to the transmission axis 100b of the upper polarizer 101b. The linearly polarized light 134 maintains its polarization after passing the liquid crystal layer 104. Because the linearly polarized light 134 has a polarization perpendicular to the metal strips 120 of the wire grid polarizer 108, the linearly polarized light 134 passes the wire grid polarizer 108 and is absorbed by the lower polarizer 101a.

Figure 3B:
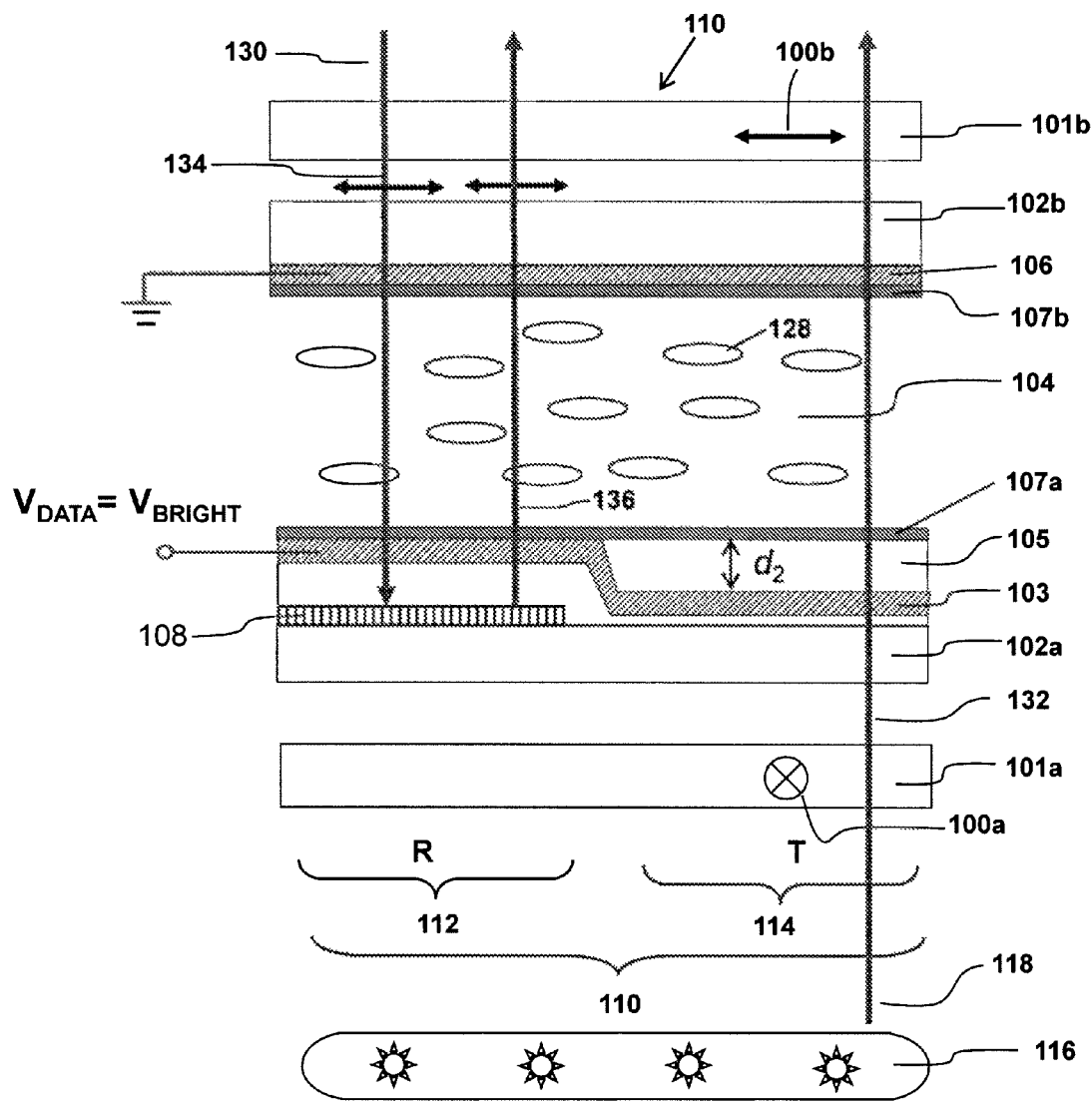

Referring to FIG. 3B, when a pixel voltage $V_{DATA}=V_{BRIGHT}$ that corresponds to a bright state is applied to the electrodes 103 and 106, the liquid crystal molecules 128 are rotated by an electric field. The pixel voltage $V_{BRIGHT}$ for the bright state is selected such that the liquid crystal layer 104 becomes similar to a half-wave plate.

In this description, when a layer or film is said to behave similar to a half-wave plate, it means that the layer or film behave similar to a half-wave plate for a specified wavelength, e.g., 589 nm. Similarly, when a layer or film is said to behave similar to a quarter-wave plate, it means that the layer or film behave similar to a quarter-wave plate for the specified wavelength.

In the R sub-pixel 112, the polarization of the linearly polarized light 134 is rotated by 90 degrees as the light 134 passes the liquid crystal layer 104, and becomes parallel to the lengthwise direction of the metal strips 120 of the wire grid polarizer 108. The light is reflected by the wire grid polarizer 108 back to the liquid crystal layer 104 as reflected light 136. After the reflected light 136 passes the liquid crystal layer 104, its polarization is rotated again by 90 degrees to become parallel to the transmission axis 100b of the upper polarizer 101b. The reflected light 136 passes the upper polarizer 101b and is seen by the user as a bright R sub-pixel 112.

In the T sub-pixel 114, as the linearly polarized light 132 passes the liquid crystal layer 104, the polarization of the light 132 is rotated by 90 degrees so that the polarization is parallel to the transmission axis 100b of the upper polarizer 101b. The light passes the upper polarizer 101b and is seen by the user as a bright T sub-pixel 114.

Although the passivation layer 105 causes the percentage of the pixel voltage applied to the R and T sub-pixels 112 and 114 to be different, the pixel voltage $V_{BRIGHT}$ is selected to be sufficiently high so that the liquid crystal molecules 128 in both the R and T sub-pixels 112 and 114 are substantially parallel to the surface of the substrates 102a and 102b. The cell gap d1 of the liquid crystal layer 104 is selected such that when the liquid crystal molecules 128 are substantially aligned parallel to the substrates 102a and 102b, the liquid crystal layer 104 behaves similar to a half wave plate.

In designing the display 100, the cell gap d1 of the liquid crystal layer 104 and the liquid crystal material are selected such that Δn·d1=λ/2 so that the liquid crystal layer 104 behaves similar to a half-wave plate in the bright state. The parameter Δn equals $n_e - n_o$, where $n_e$ and $n_o$ are the extraordinary and ordinary refractive indices, respectively, of the liquid crystal material. In some examples, Δn·d1 is selected to be slightly larger than λ/2 because there may be a small amount of phase loss at boundaries of the liquid crystal layer, and a higher Δn·d1 allows the bright state to be achieved at a lower pixel data voltage. Selection of the liquid crystal material may take into consideration factors such as a large Δn value to reduce the required cell gap, a high dielectric anisotropy (Δ∈) to reduce the on-state driving voltage, and a low viscosity to reduce the response time.

When the pixel voltage corresponds to a gray scale voltage between the dark state and the bright state (e.g., a gray scale level between 0 and 255), the percentages of the pixel voltage $V_{DATA}$ applied to the R sub-pixel 112 and the T sub-pixel 114 are different, as described below.

FIG. 4 shows a diagram of an equivalent circuit of the pixel 110 in FIG. 1. When the voltage on a gate line 150 is pulled high, the thin film transistor 148 of the pixel 100 is turned on, allowing the pixel voltage $V_{DATA}$ on a data line 152 to charge a storage capacitor Cs (146) to the pixel voltage $V_{DATA}$. In this example, the TFT 148 is an N-type transistor. The portion of the liquid crystal layer 104 in the R sub-pixel 112 has an effective capacitance that is represented by a capacitor $C_{LCR}$ (140). The portion of the liquid crystal layer 104 in the T sub-pixel 114 has an effective capacitance that is represented by a capacitor $C_{LCT}$ (142). The passivation layer 105 is made of a dielectric material and has an effective capacitance represented by a capacitor $C_D$ (144). The pixel voltage $V_{DATA}$ is substantially fully applied to the liquid crystal layer 104 in the R sub-pixel 112. By comparison, because $C_D$ is connected in series with $C_{LCT}$, only a portion of the pixel voltage $V_{DATA}$ is applied to the portion of the liquid crystal layer 104 in the T sub-pixel 114.

Figure 5:
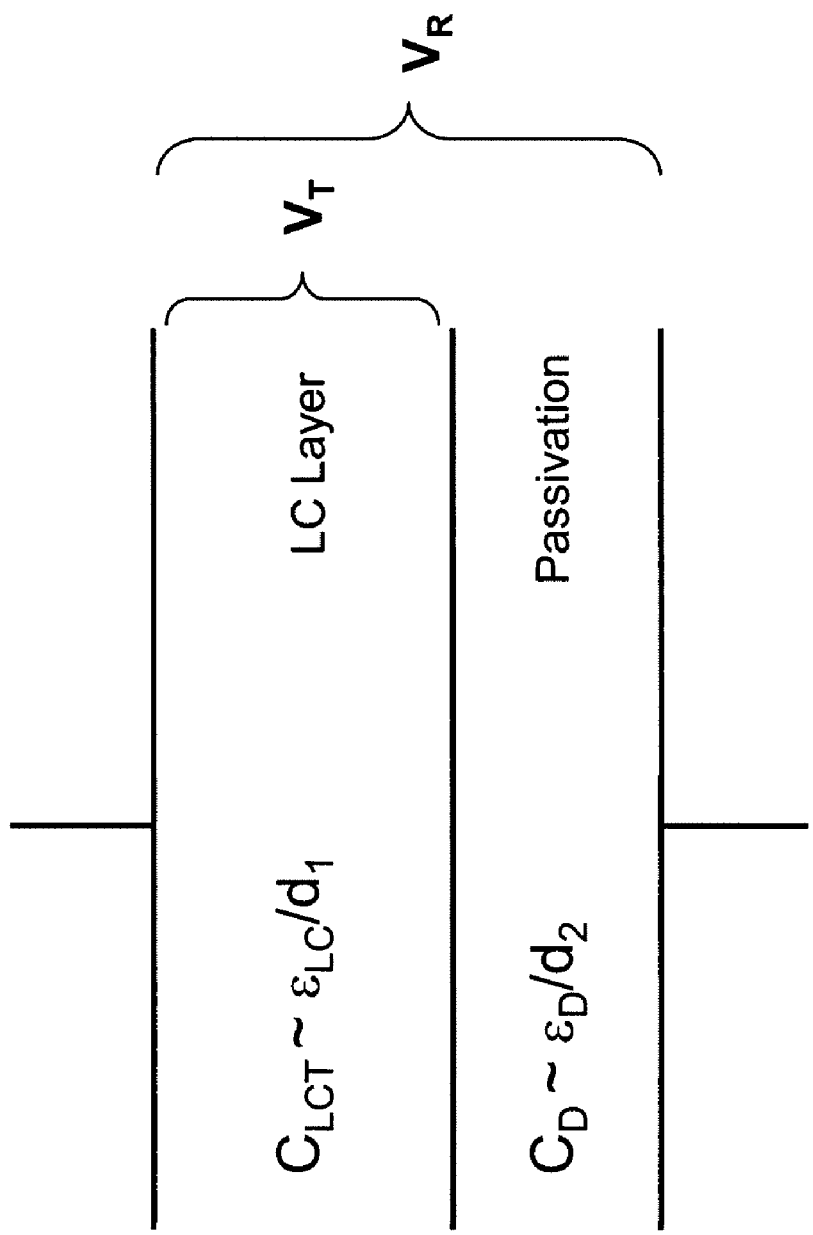
FIG. 5 is a diagram of capacitances.

Referring to FIG. 5, the capacitances $C_{LCT}$ and $C_D$ of the liquid crystal layer 104 and the passivation layer 105, respectively, in the T sub-pixel are approximately equal to $$C_{LCT} = \frac{\varepsilon_{LC}}{d_1} \text{ and } C_D = \frac{\varepsilon_D}{d_2},$$

respectively. If the voltage applied to the liquid crystal layer 104 in the R sub-pixel 112 and T sub-pixel 114 are denoted $V_R$ and $V_T$, respectively, then $$V_T = \frac{C_D}{C_D + C_{LCT}} V_R. \quad \text{(Equ. 1)}$$

Figure 6:
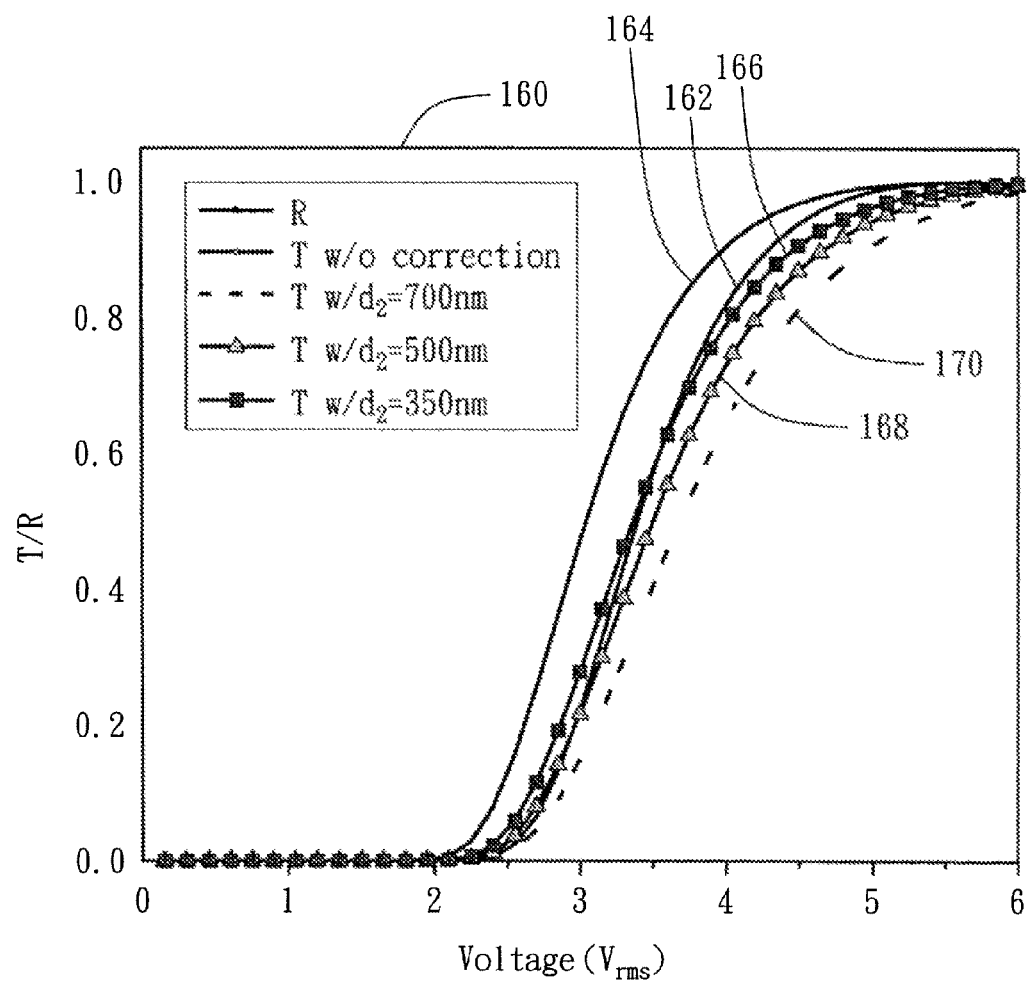
FIGS. 6 and 7 are graphs of voltage-reflectance and voltage-transmittance characteristics.

FIG. 6 is a graph 160 showing a curve 162 that represents the voltage-reflectance characteristics of the R sub-pixel 112. Also shown are curves 164, 166, 168, and 170 representing the voltage-transmittance characteristics of the T sub-pixel 114 when the passivation layer 105 has a thickness of 0, 350 nm, 500 nm, and 700 nm, respectively. The horizontal axis represents the voltage applied to the electrodes 103 and 106, which is equal to the voltage $V_R$ applied to the R sub-pixel 112. The data points for the graph 160 were obtained using simulation. When the thickness d2 of the passivation layer 105 is equal to 350 nm, the curve 162 more closely matches the curve 166 (as compared to the curve 164 versus curve 166), indicating that the voltage-reflectance characteristic of the R sub-pixel 112 more closely matches the voltage-transmittance characteristic of the T sub-pixel 114. The R sub-pixel 112 and the T sub-pixel 114 will show similar gray scale (or color) for a given pixel voltage $V_{DATA}$.

In the simulations used to obtain the data for the graph 160, the liquid crystal material used was MLC-6608, available from Merck, Japan. The liquid crystal material has a parallel dielectric constant $\in_{//}$=3.6, perpendicular dielectric constant $\in_\perp$=7.8, and elastic constants $K_{11}$=16.7 pN, $K_{22}$=7.0 pN, and $K_{33}$=18.1 pN. The liquid crystal material has an extraordinary refractive index $n_e$=1.5578 and an ordinary refractive index $n_o$=1.4748 at λ=589 nm. The parameter d1·Δn of the liquid crystal layer 104 is set at 0.36 μm. The passivation layer 105 can be made of dielectric materials (e.g., $SiO_2$, which has a dielectric constant of 3.9) that are compatible with the thin film transistor fabrication process.

Figure 7:
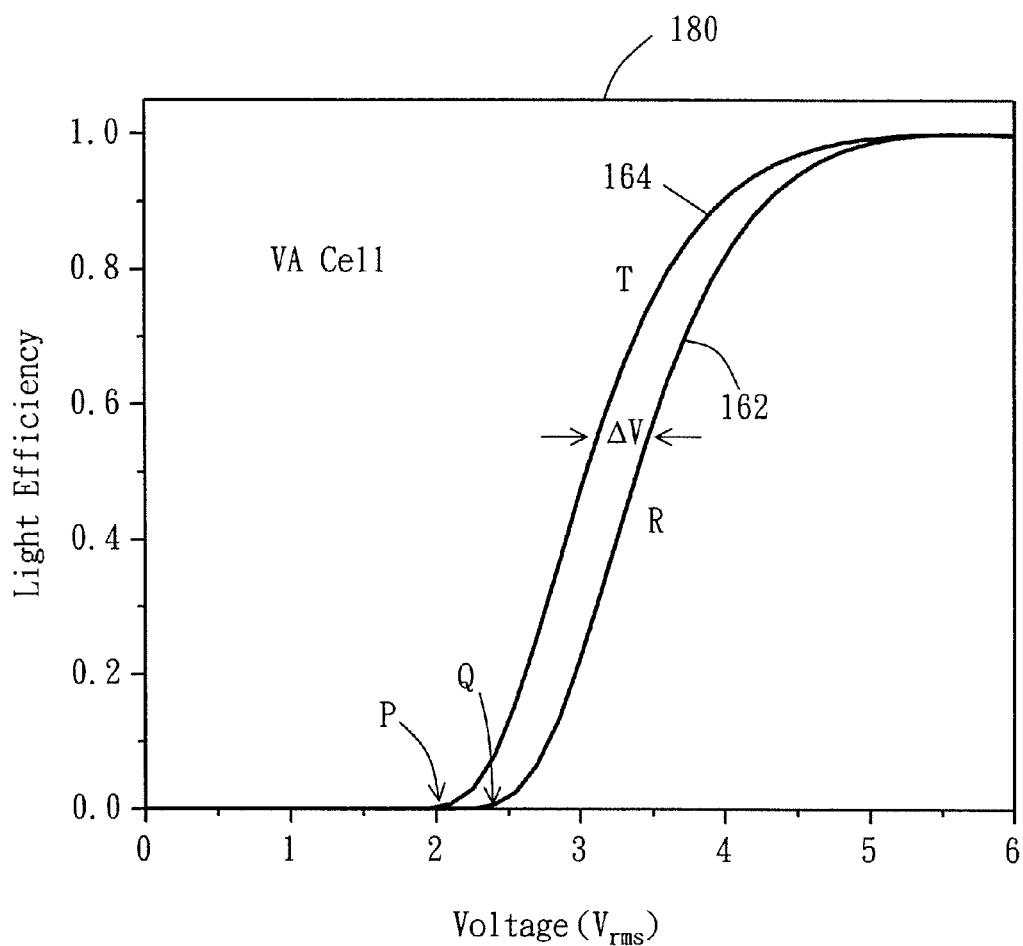

The thickness of the passivation layer 105 can be estimated using a voltage shifting method. FIG. 7 is a graph 180 that shows the curves 162 and 164 of FIG. 6. The curves 162 and 164 represent the voltage reflectance characteristics of the R sub-pixel 112 and the voltage-transmittance characteristics of the T sub-pixel 114, respectively, when the passivation layer 105 has a thickness d2=0. If the curve 164 is shifted towards the right of the figure, the curves 162 and 164 will more closely match each other. This means that for a given gray scale, the voltage level applied to the T sub-pixel 114 should be lower by a certain amount ΔV than the voltage level applied to the R sub-pixel 112.

Figure 8:
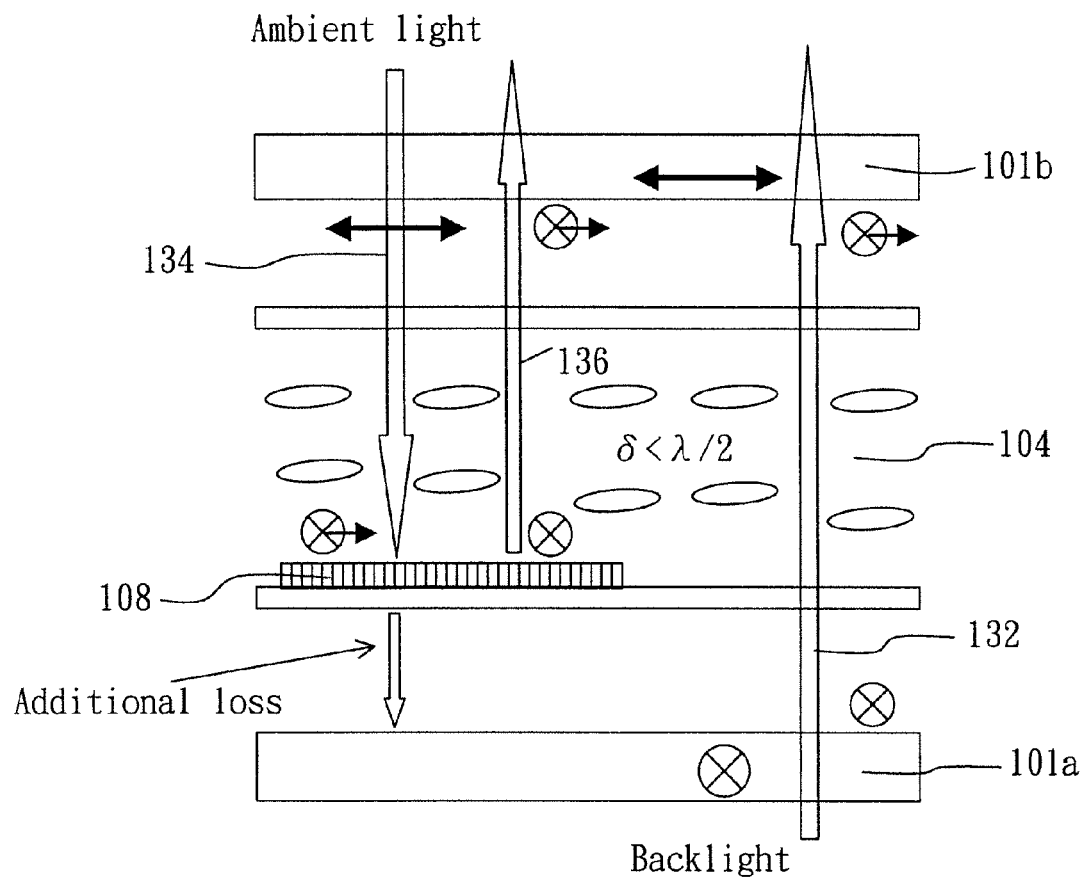
FIG. 8 is a cross-sectional diagram of a VA mode transflective liquid crystal display.

The differences in the V-R curve 162 and V-T curve 164 in FIG. 7 may be caused by the loss of light in the R sub-pixel 112 when the pixel voltage $V_{DATA}$ corresponds to a gray scale between the dark and bright states. Referring to FIG. 8, when the pixel voltage $V_{DATA}$ is at a level such that the phase retardation from the liquid crystal layer 104 is less than that from a half-wave plate, the linearly polarized light 134 will become elliptically polarized when the light 134 reaches the surface of the wire grid polarizer 108. A portion of the light 134 (the component of the light perpendicular to the metal stripes 120) passes the wire grid polarizer 108 and is absorbed by the lower polarizer 101a. Thus, the amount of light 136 reflected by the wire grid polarizer 108 is less than the backlight 132 that passed the linear polarizer 101a. This accounts for the lower luminance in the R sub-pixel 112 compared to the T sub-pixel 114 for a given pixel voltage $V_{DATA}$.

The amount of capacitance CD that is need to achieve an amount of voltage shift so that the V-R curve 162 more closely matches the V-T curve 164 can be determined as follows. Referring back to FIG. 7, assume for a given light efficiency, the voltage applied to the liquid crystal layer 104 in the R sub-pixel is $V_R$, and the voltage applied to the liquid crystal layer 104 in the T sub-pixel is $V_T$, and $V_R=V_T+\Delta V$.

Replacing $V_R$ with $V_T+\Delta V$ in Equ. 1, the following can be obtained:

$$V_T = \frac{C_D}{C_D + C_{LCT}}(V_T + \Delta V). \quad \text{(Equ. 2)}$$

In Equ. 2, $$C_D = \frac{\varepsilon_D}{d_2} \text{ and } C_{LCT} = \frac{\varepsilon_{LC}}{d_1}.$$

The dielectric constants $\in_D$ and $\in_{LC}$ are determined by the material used for the passivation layer 105 and the liquid crystal layer 104. The dielectric constant $\in_{LC}$ is a value between $\in_{//}$ and $\in_\perp$ based on the liquid crystal director distribution at different gray levels. For example, when the liquid crystal molecules are mostly aligned perpendicular to the substrates, $\in_{LC}$ is close to $\in_{//}$, and when the molecules are mostly aligned parallel to the substrates, then $\in_{LC}$ is close to $\in_\perp$. The thickness d1 of the liquid crystal material is selected such that the liquid crystal layer 104 behaves like a half wave plate in the bright state. In this example, $n_e=1.5578$ and $n_o=1.4748$ at $\lambda=589$ nm, and $d1\cdot\Delta n$ of the liquid crystal layer 104 is set at 0.36 μm, so d1=4.34 μm.

$V_T$ and $\Delta V$ can be selected from any point on the curve 164. For example, the threshold voltage (at point P on curve 164) of the T sub-pixel is approximately 2.1 V, and the threshold voltage (at point Q on curve 162) of the R sub-pixel is approximately 2.4 V, so $\Delta V$ is approximately 0.3V. When the values for $V_T=2.1V$, $\Delta V=0.3$ V, d1=4.34 μm, $\in_D=3.9$, and $\in_{LC}\sim 3.6$ are used in Equ. 2, it can be determined that d2 is approximately 670 nm, which approximately matches the value d2=700 nm determined by simulations shown in FIG. 6 when the matching point (the point where the V-R curve matches the V-T curve) is set at $V_T=2.1$ V or $V_R=2.4$ V (point P or Q, respectively, in FIG. 7). In FIG. 6, the V-R curve 162 matches the V-T curve 170 (representing d2=700 nm) at $V_R=2.4$ V, corresponding to a transmittance and a reflectance about zero. In order for the V-T and V-R curves to match each other at an intermediate gray level, the thickness of the d2 can be adjusted to a smaller value, such as 350 nm. For example, in FIG. 6, the V-R curve 162 matches the V-T curve 166 (representing d2=350 nm) at $V_R=3.5$ V, corresponding to a transmittance and reflectance of about 60%.

Figure 9:
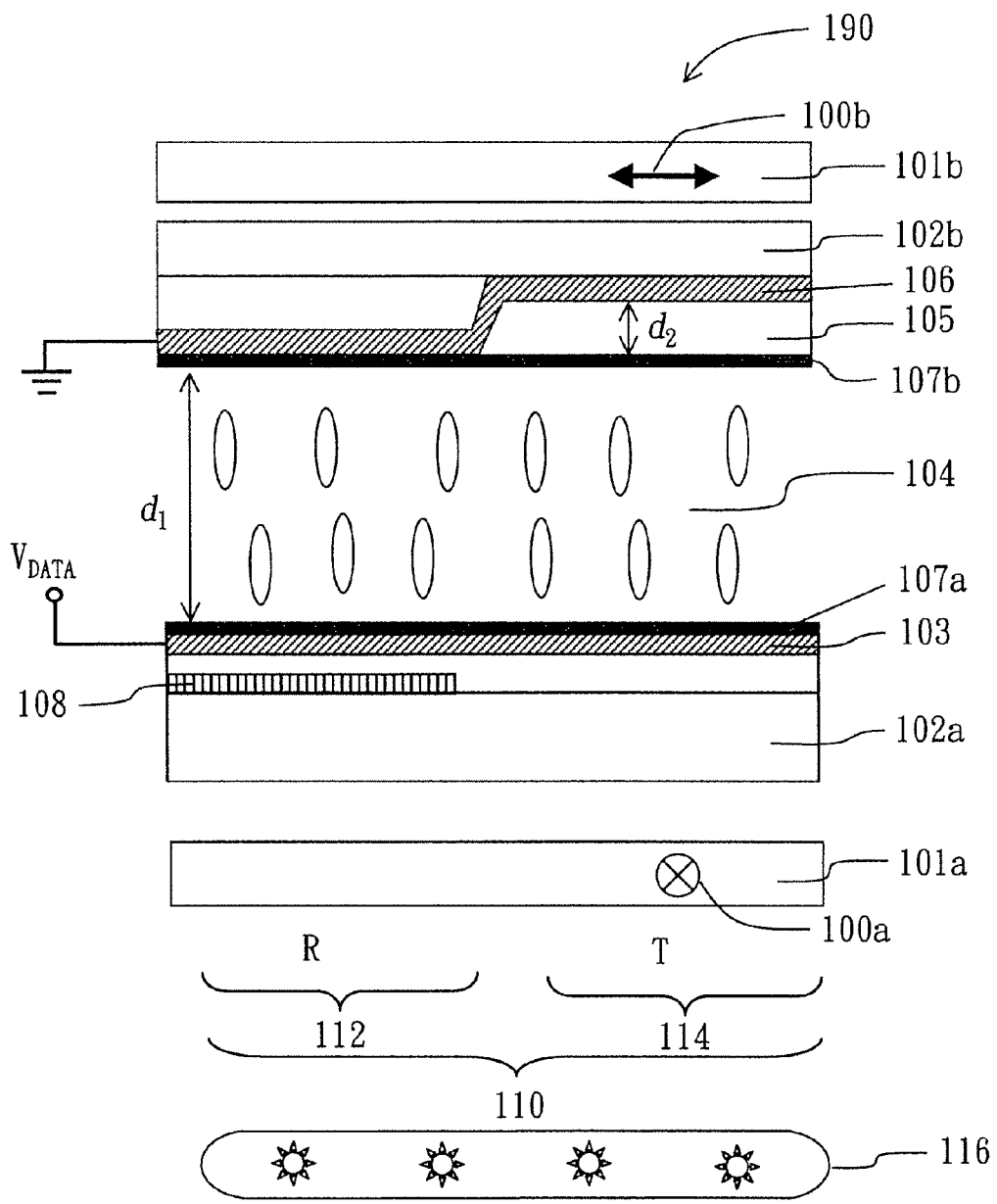
FIG. 9 is a cross-sectional diagram of a VA mode transflective liquid crystal display.

FIG. 9 is a cross-sectional diagram of an example of a transflective liquid crystal display 190 that is similar to the transflective liquid crystal display 100 of FIG. 1. The difference between displays 100 and 190 is that in the T sub-pixel 114 of the display 190, the passivation layer 105 is positioned between the upper electrode 106 and the upper alignment layer 107b. The lower electrode 103 is directly adjacent to the lower alignment layer 107a. In the display 190, similar to the display 100, when a pixel voltage $V_{DATA}$ is applied to the electrodes 103 and 106, the percentage of the pixel voltage $V_{DATA}$ applied to the liquid crystal layer 104 in the R sub-pixel 112 is higher than that in the T sub-pixel 114.

Figure 10:
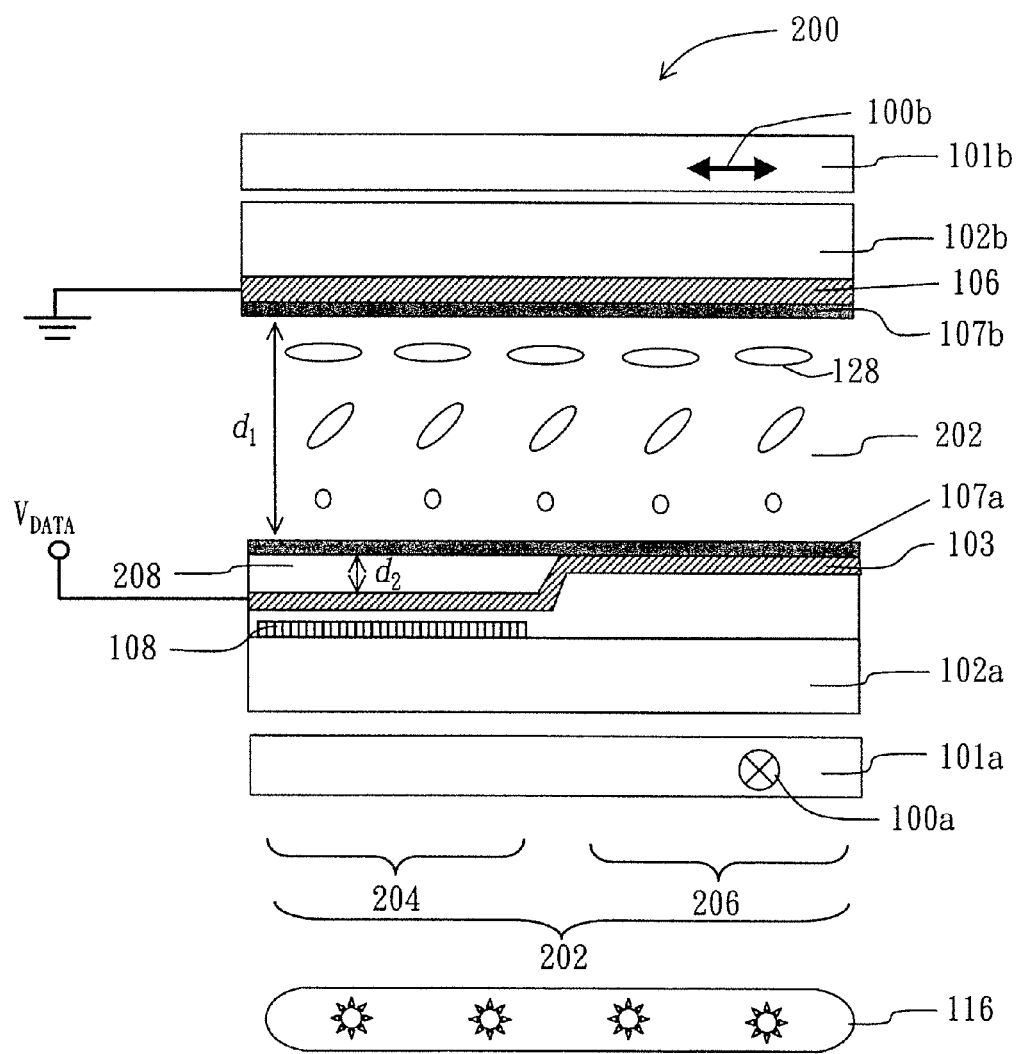
FIGS. 10, 11A, and 11B are cross-sectional diagrams of a TN mode transflective liquid crystal display.

FIG. 10 is a cross-sectional diagram of an example of a transflective liquid crystal display 200 that includes a twisted nematic type liquid crystal layer 202 positioned between a lower glass substrate 102a and an upper glass substrate 102b. FIG. 10 shows a pixel 202 that includes a R sub-pixel 204 and a T sub-pixel 206. The display 200 has a lower linear polarizer 101a, an upper linear polarizer 101b, a wire grid polarizer 108, a lower alignment layer 107a, an upper alignment layer 107b, and an upper transparent electrode 106, similar to those in the display 100 of FIG. 1.

In the display 200, in the R sub-pixel 204, a passivation layer 208 is positioned between the lower electrode 103 and the lower alignment layer 204. In the T sub-pixel 206, the lower electrode 103 is directly adjacent to the lower alignment layer 107a. When a pixel voltage $V_{DATA}$ is applied to the electrodes 103 and 106, all of the pixel voltage $V_{DATA}$ is applied to the liquid crystal layer 202 in the T sub-pixel 206, and a lower percentage of the pixel voltage $V_{DATA}$ is applied to the liquid crystal layer 202 in the R sub-pixel 204.

When no voltage is applied to the electrodes 103 and 106, the liquid crystal molecules 128 of the liquid crystal layer 202 are substantially parallel to the surface of the substrates 101a and 101b. The directors of the liquid crystal molecules 128 are oriented at different directions depending on the position of the molecules 128. The liquid crystal molecules 128 form a twisted structure in which the molecules 128 rotate 90 degrees from a position adjacent to the lower alignment layer 107a to a position adjacent to the upper alignment layer 107b. The liquid crystal molecules 128 adjacent to the lower alignment layer 107a are aligned substantially parallel to the transmission axis 100a of the lower linear polarizer 101a, and liquid crystal molecules 128 adjacent to the upper alignment layer 107b are aligned substantially parallel to the transmission axis 100b of the upper linear polarizer 101b.

When a pixel voltage $V_{DATA}=V_{DARK}$ corresponding to a dark state is applied to the electrodes 103 and 106, the liquid crystal molecules 128 of the liquid crystal layer 202 are tilted by the electric field generated by the pixel voltage $V_{DATA}$. The level of the pixel voltage for the dark state is selected such that the liquid crystal molecules 128 become substantially aligned along a direction normal to the surfaces of the substrates 102a and 102b.

The following describes the operation of the display 200.

Figure 11A:
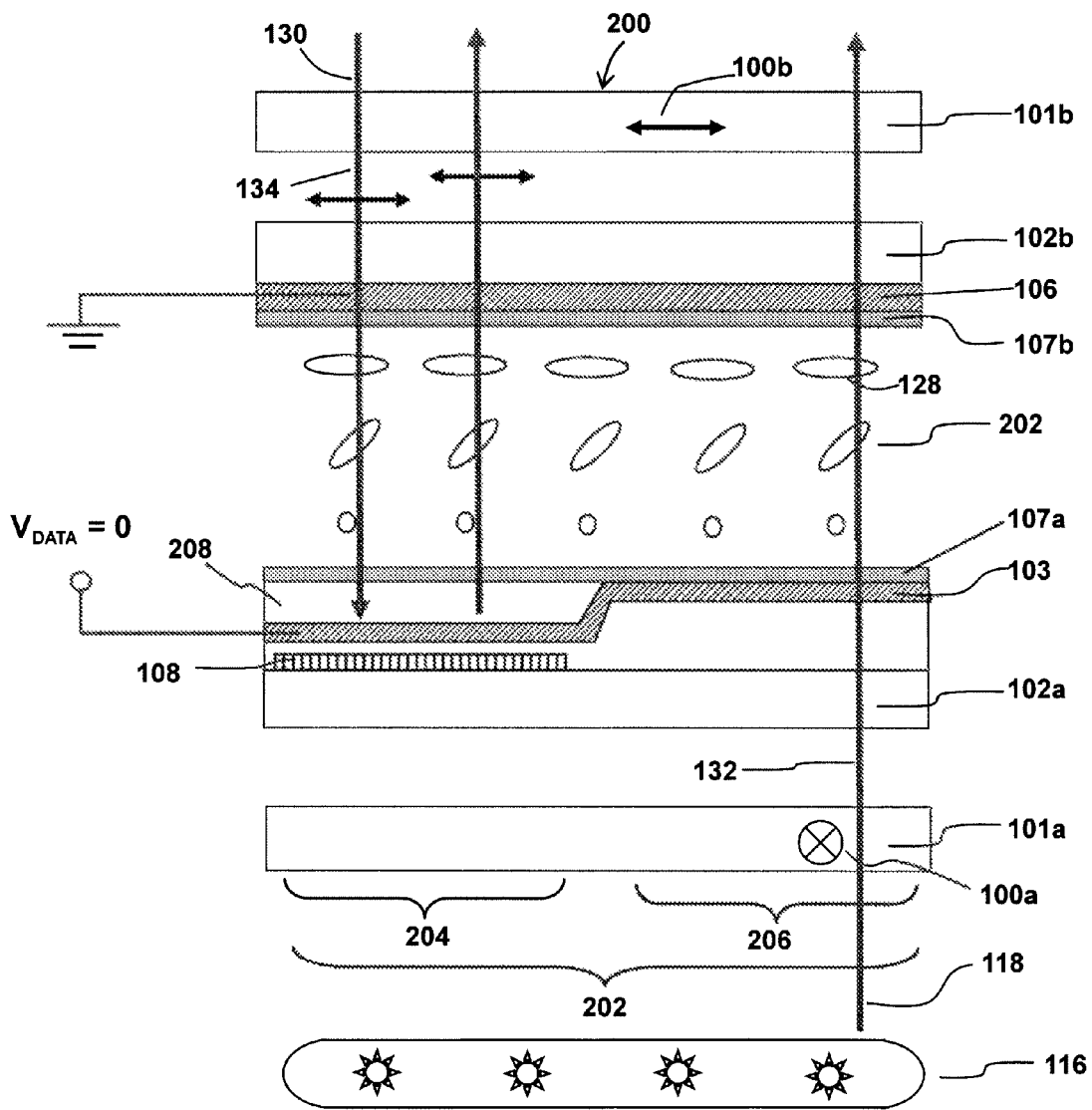

Referring to FIG. 11A, when no voltage is applied to the lower and upper electrodes 103 and 106, the liquid crystal molecules 128 form a twisted structure as described above. In the T sub-pixel 206, backlight 118 from the backlight module 116 passes the lower linear polarizer 101a and becomes linearly polarized light 132 having a polarization direction parallel to the transmission axis 100a of the lower linear polarizer 101a. As the linearly polarized light 132 passes the liquid crystal layer 202, the polarization of the light 132 is rotated 90 degrees and becomes parallel to the transmission axis 100b. The light 132 passes the upper polarizer 101b and is seen by the viewer as a bright T sub-pixel 206.

In the R sub-pixel 204, incident ambient light 130 first passes the upper polarizer 101b and becomes linearly polarized light 134 having a polarization direction parallel to the transmission axis 100b of the upper polarizer 101b. The polarization of the linearly polarized light 134 is rotated 90 degrees as the light 134 passes the liquid crystal layer 202 and becomes parallel to the lengthwise direction of the metal strips 120 on the wire grid polarizer 108. The linearly polarized light 134 is reflected by the wire grid polarizer 108. The reflected light initially has a polarization parallel to the lengthwise direction of the metal strips 120. As the reflected light passes the liquid crystal layer 202, the polarization of the reflected light is rotated 90 degrees and becomes parallel to the transmission axis of the upper polarizer 100b. The reflected light passes the upper polarizer 100b and is seen by the viewer as a bright R sub-pixel 204. The display 200 is normally white because the pixels are in bright states when no pixel voltage is applied to the pixels.

Figure 11B:
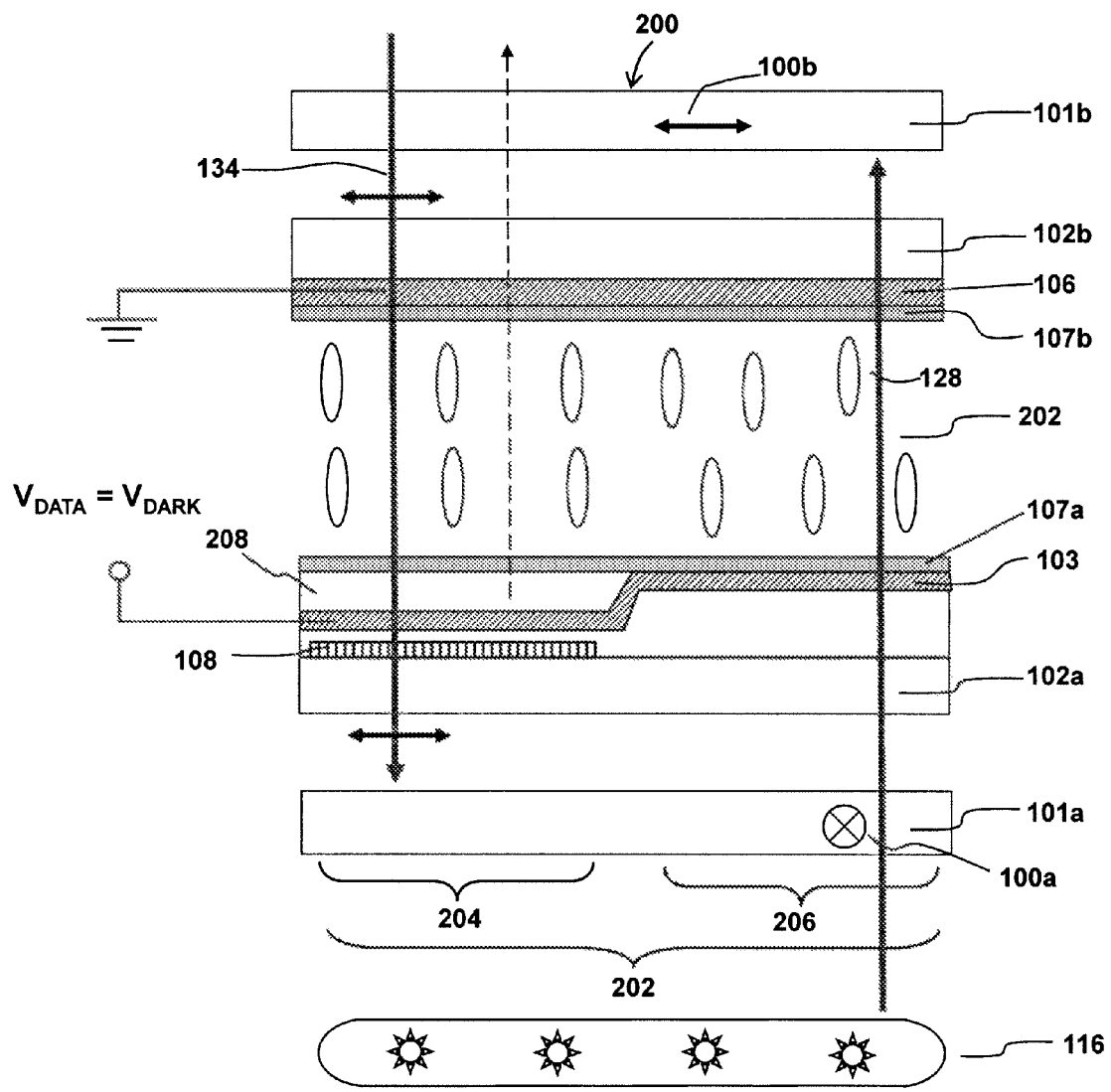

Referring to FIG. 11B, when a pixel voltage $V_{DATA}=V_{DARK}$ that corresponds to the dark state is applied to the electrodes 103 and 106, the liquid crystal molecules 128 become substantially aligned along a direction normal to the surfaces of the substrates 102a and 102b. In the R sub-pixel 204, the polarization of the linearly polarized light 134 does not change as the light 134 passes the liquid crystal layer 202. Because the light 134 has a polarization perpendicular to the lengthwise direction of the metal strips 120 of the wire grid polarizer 108, the light 134 passes the wire grid polarizer 108 and is absorbed by the lower polarizer 101a. The viewer sees a dark R sub-pixel 204. In the T sub-pixel 206, the linearly polarized light 132 maintains its polarization as it passes the liquid crystal layer 202, and is blocked by the upper polarizer 101b. The viewer sees a dark T sub-pixel 206.

Although the passivation layer 208 causes the percentage of the pixel voltage $V_{DATA}$ applied to the R and T sub-pixels 202 and 206 to be different, the pixel voltage $V_{DATA}=V_{DARK}$ is selected to be sufficiently high such that the liquid crystal molecules 128 in both the R and T sub-pixels are substantially vertical to the surfaces of the substrates 102a and 102b.

Figure 12:
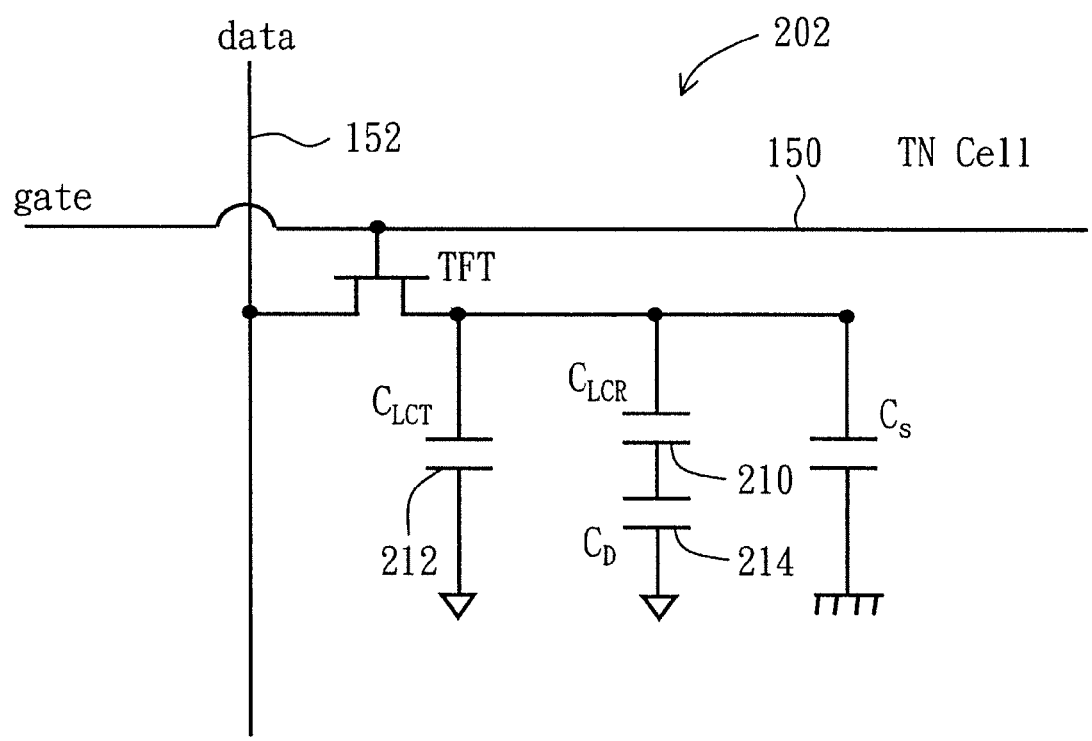
FIG. 12 is a diagram of an equivalent circuit.

FIG. 12 shows a diagram of an equivalent circuit of the pixel 202 in FIG. 10. The portion of the liquid crystal layer 202 in the R sub-pixel 204 has an effective capacitance that is represented by a capacitor $C_{LCR}$ (210). The portion of the liquid crystal layer 202 in the T sub-pixel 206 has an effective capacitance that is represented by a capacitor $C_{LCT}$ (212). The passivation layer 208 has an effective capacitance represented by a capacitor $C_D$ (214). The pixel voltage $V_{DATA}$ is substantially fully applied to the liquid crystal layer 202 in the T sub-pixel 206. By comparison, because $C_D$ is connected in series with $C_{LCR}$, only a portion of the pixel voltage $V_{DATA}$ is applied to the portion of the liquid crystal layer 202 in the R sub-pixel 204.

Figure 13:
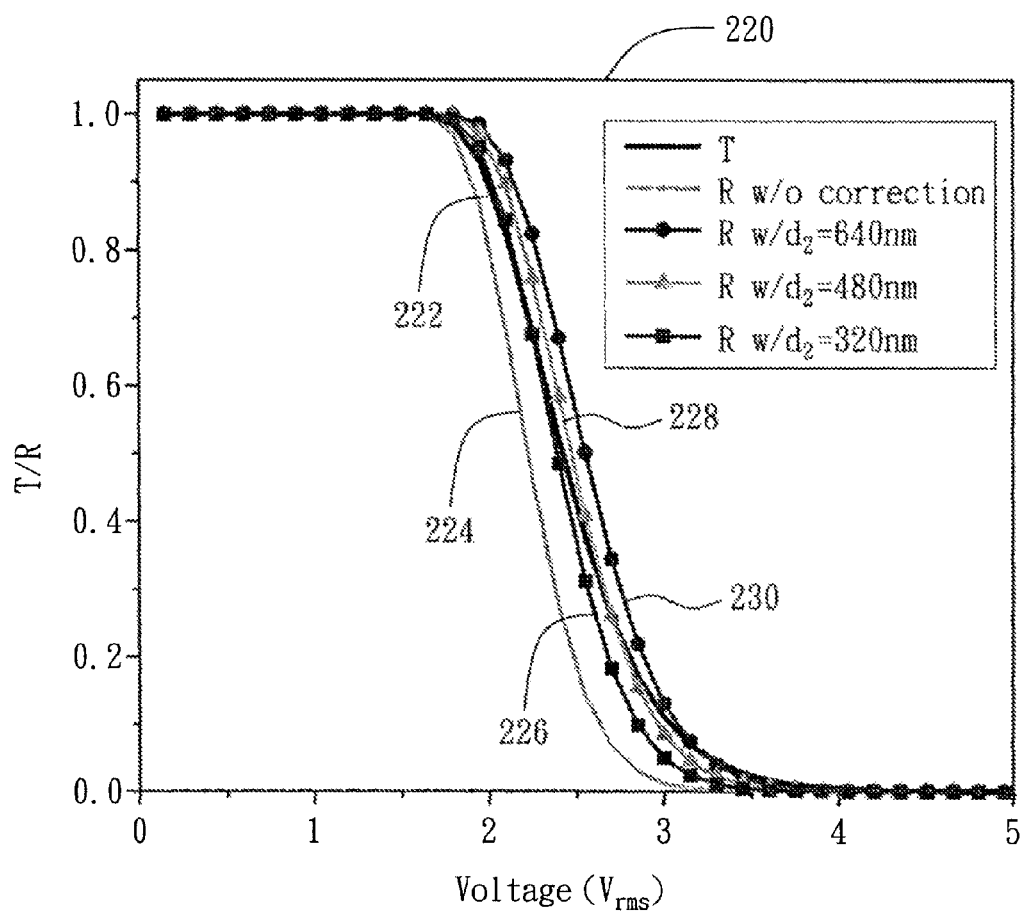
FIGS. 13 and 14 are graphs showing voltage-reflectance and voltage-transmittance characteristics.

FIG. 13 is a graph 220 showing a curve 222 that represents the voltage-transmittance characteristics of the T sub-pixel 206. Also shown are curves 224, 226, 228, and 230 representing the voltage-reflectance characteristics of the R sub-pixel 204 when the passivation layer 208 has a thickness of 0, 320 nm, 480 nm, and 640 nm, respectively. The data points for the graph 220 were obtained using simulation. When the thickness d2 of the passivation layer 208 is equal to 480 nm, the curve 228 more closely matches the curve 222 (as compared to the curve 224 versus curve 222), indicating that the voltage-transmittance characteristic of the T sub-pixel 206 more closely matches the voltage-reflectance characteristic of the R sub-pixel 204. The R sub-pixel 204 and the T sub-pixel 206 will show similar gray scale (or color) for a given pixel voltage $V_{DATA}$.

In the simulations used to obtain the data for the graph 220, the liquid crystal material used was ZLI-4792, available from Merck, Japan. The liquid crystal material has a parallel dielectric constant $\in_{//}=8.3$, perpendicular dielectric constant $\in_{\perp}=3.1$, and elastic constants $K_{11}=13.2$ pN, $K_{33}=6.5$ pN, and $K_{33}=18.3$ pN. The liquid crystal material has an extraordinary refractive index $n_e=1.5763$ and an ordinary refractive index $n_o=1.4794$ at $\lambda=589$ nm. The parameter $d1 \cdot \Delta n$ of the liquid crystal layer 104 is set at 0.48 μm. The passivation layer 105 can be made of dielectric materials (e.g., $SiO_2$, which has a dielectric constant of 3.9) that are compatible with the thin film transistor fabrication process.

Figure 14:
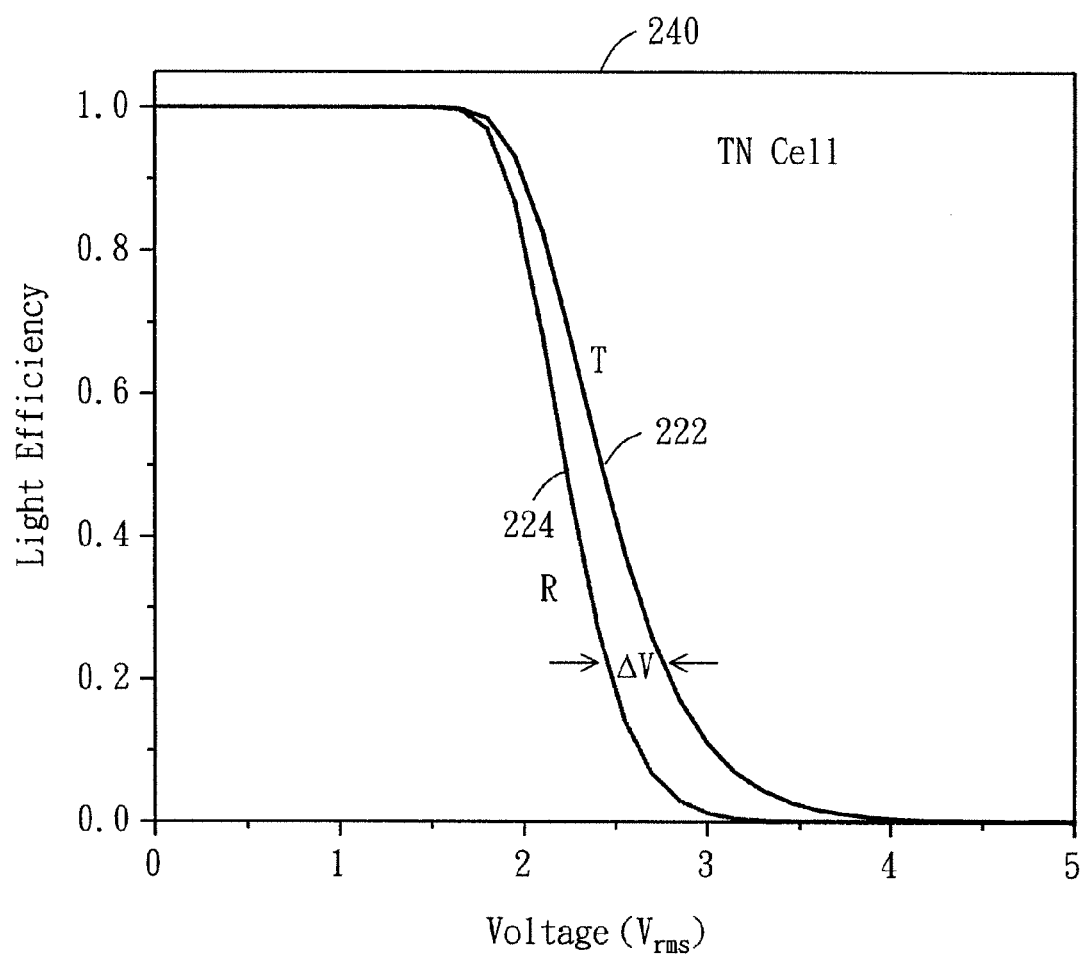

The thickness of the passivation layer 208 of FIG. 10 can be estimated using a voltage shifting method, similar to that for the passivation layer 105 of FIG. 1. FIG. 14 is a graph 240 that shows curves 222 and 224 representing the voltage-transmittance characteristics of the T sub-pixel 206 and the voltage-reflectance characteristics of the R sub-pixel 204, respectively, when the passivation layer 208 has a thickness d2=0. If the curve 224 is shifted towards the right of the figure, the curves 222 and 224 will more closely match each other. This means that for a given gray scale, the voltage level applied to the R sub-pixel 204 should be lower by a certain amount ΔV than the voltage level applied to the T sub-pixel 206. The thickness of the passivation layer 208 in FIG. 10 can be calculated using a method similar to that for calculating the thickness of the passivation layer 105 in FIG. 1.

Figure 15:
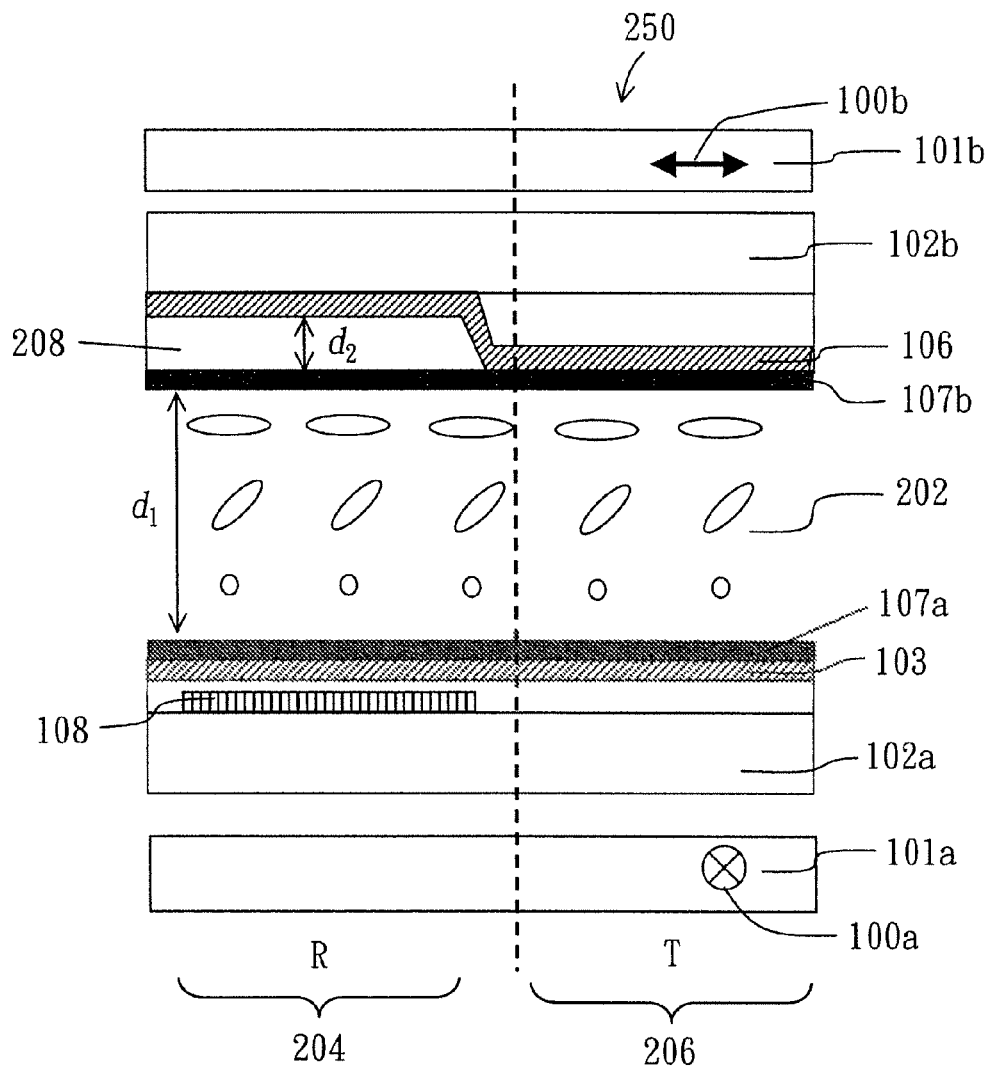
FIG. 15 is a cross-sectional diagram of a TN mode transflective liquid crystal display.

FIG. 15 is a cross-sectional diagram of an example of a transflective liquid crystal display 250 that is similar to the transflective liquid crystal display 200 of FIG. 10, except that in the R sub-pixel 204 of the display 250, the passivation layer 208 is positioned between the upper electrode 106 and the upper alignment layer 107b. The lower electrode 103 is directly adjacent to the lower alignment layer 107a. In the display 250, similar to the display 200, when a pixel voltage $V_{DATA}$ is applied to the electrodes 103 and 106, the percentage of the pixel voltage $V_{DATA}$ applied to the liquid crystal layer 202 in the R sub-pixel 204 is lower than that in the T sub-pixel 206.

The viewing angles of the displays 100 (FIG. 1), 190 (FIG. 9), 200 (FIG. 10), and 250 (FIG. 15) can be expanded by adding a compensation film between the upper substrate 102b and the upper polarizer 101b.

Figure 16A:
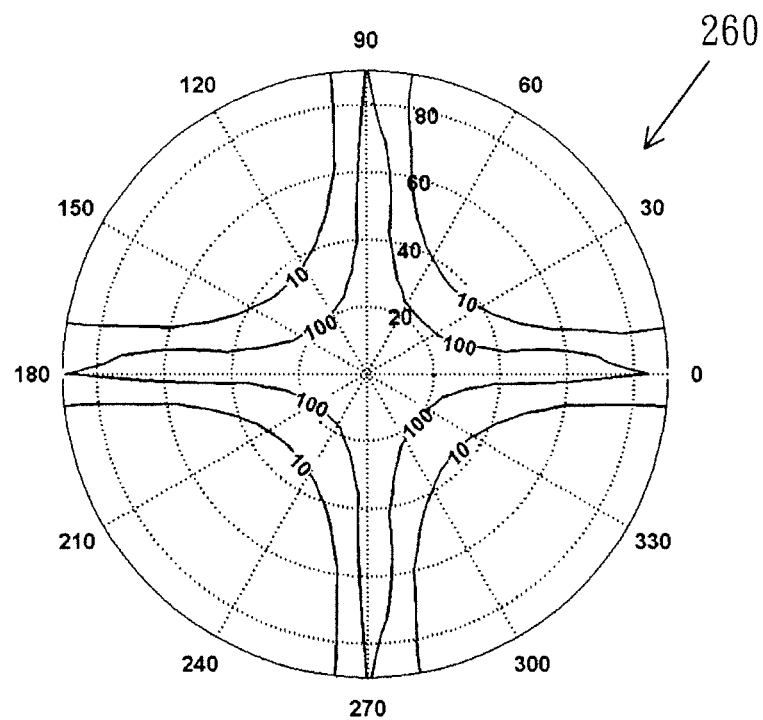
FIGS. 16A and 16B are iso-contrast plots.

FIG. 16A is an iso-contrast plot 260 for an example of the display 100 (FIG. 1), in which a compensation film was not used. In this example, the display 100 included a liquid crystal material MLC-6608, available from Merck, Japan, in which the d·Δn parameter of the liquid crystal material equals 0.36 μm. The display 100 can achieve 10:1 contrast ratio over 40 degrees in most directions.

Figure 16B:
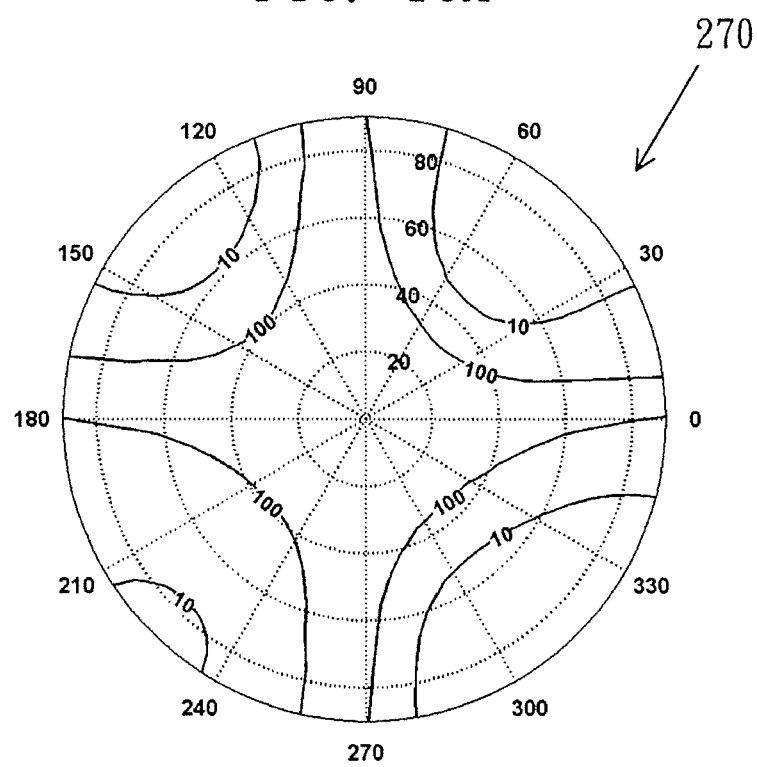

FIG. 16B is an iso-contrast plot 270 for an example of the display 100 (FIG. 1), in which a compensation film was used to compensate light leakage from the liquid crystal phase retardation at off-axis angles. The compensation film used in this example is a negative C film with refractive indices $n_o=1.5110$, and $n_e=1.5095$, and the parameter d·Δn of the negative C film is 0.36 μm. The d·Δn value for the liquid crystal layer and the C film are set to be equal so that the off-axis phase retardation from the liquid crystal layer cancels the off-axis phase retardation from the C film. With the addition of a compensation film, the display 100 has a 10:1 contrast ratio over 60 degrees in most directions.

FIG. 17 is a diagram of an example of the liquid crystal display 100, in which the figure shows an array 12 of pixels 110 that are controlled by one or more gate drivers 16 and one or more data drivers 18. Each pixel 110 includes one or more thin film transistors (TFT) 148, a storage capacitor $C_{ST}$ 146, and other components shown in FIG. 1.

In a color display, each pixel 110 can have a red, green, or blue filter to show red, green, or blue color, respectively. A red pixel, a green pixel, and a blue pixel can together generate a color image pixel. By controlling the gray scale levels of the red, green, and blue pixels, each color image pixel can display a wide range of colors and gray scale levels.

Other implementations and applications are also within the scope of the following claims. For example, in FIG. 17, the pixels 110 can be replaced by other types of pixels, such as those shown in FIGS. 9, 10, and 15. Additional passivation layers and alignment layers can be used in the displays described above. The materials used for the components of the displays, such as the liquid crystal layer, the polarization films, and the compensation films, can use materials and have parameters different from those described above. The retardation values d·Δn of the films can be different from those described above. Compensation films different from those described above can be used. In some examples, a negative C film or a positive O film can be used as a compensation film. Other compensation films are described in "Analytical solutions for uniaxial-film-compensated wide-view liquid crystal displays" by X. Zhu et al, Journal of Display Technology, vol. 2, pages 2-20, 2006, herein incorporated by reference. When the display is operating in the transmissive mode in which the backlight module is turned on, some ambient light may be reflected by the transflector, so the display can operate in both the transmissive and reflective modes at the same time.

In the description above, the terms "upper" and "lower" are used to describe relative positions of components as shown in the figures. The display can have various orientations, so for example, an upper film may be positioned below a lower film depending on the orientation of the display. The orientations of the liquid crystal molecules described above refer to the directions of directors of the liquid crystal molecules. The molecules do not necessarily all point to the same direction all the time. The molecules may tend to point more in one direction (represented by the director) over time than other directions. For example, the phrase "the liquid crystal molecules are substantially aligned along a direction normal to the substrates" means that the average direction of the directors of the liquid crystal molecules is generally aligned along the normal direction, but the individual molecules may point to different directions.

What is claimed is:

1. A display comprising:
   a plurality of normally dark pixel circuits each comprising:
     a first electrode;
     a second electrode;
     a reflective region to reflect ambient light, the reflective region comprising a first portion of a liquid crystal layer between the first and second electrodes, and a polarization dependent reflector that transmits light having a first polarization and reflects light having a second polarization;
     a transmissive region to transmit backlight, the transmissive region comprising a second portion of the liquid crystal layer between the first and second electrodes;
     a dielectric layer between the first and second electrodes in the transmissive region, the dielectric layer configured such that when a pixel voltage is applied to the first and second electrodes, the percentage of the pixel voltage applied across the first portion of the liquid crystal layer is higher than the percentage of the pixel voltage applied across the second portion of the liquid crystal layer; and
   a backlight module to generate the backlight
   wherein the dielectric layer and the polarization dependent reflector face the same side of the liquid crystal layer.

2. The display of claim 1 wherein the polarization dependent reflector comprises a wire grid polarizer.

3. The display of claim 1 wherein the liquid crystal layer is between two substrates, and the liquid crystal layer comprises liquid crystal molecules that are substantially aligned along a direction normal to the substrates when no voltage is applied to the first and second electrodes.

4. The display of claim 1 wherein the dielectric layer has a dielectric constant and a thickness that are selected to reduce a difference between a transmittance of the transmissive region and a reflectance of the reflective region for a given pixel voltage applied to the first and second electrodes.

5. The display of claim 1 wherein the dielectric layer has an effective capacitance that is connected in series with an effective capacitance of the liquid crystal layer between the first and second electrodes.

6. The display of claim 1 wherein the dielectric layer comprises at least one of silicon oxide and silicon nitride.

7. The display of claim 1 wherein at least one of the first electrode and the second electrode comprises at least one of indium tin oxide, indium zinc oxide, and gallium zinc oxide.

8. The display of claim 1, further comprising a first linear polarizer and a second linear polarizer that both extend over the transmissive and reflective regions, the first and second linear polarizers being at different sides of the liquid crystal layer.

9. The display of claim 8 wherein the first linear polarizer is closer to a viewer than the second linear polarizer, and the polarization dependent reflector has a reflective axis that is perpendicular to a transmission axis of the first linear polarizer.

10. The display of claim 1 wherein the liquid crystal layer comprises a negative dielectric anisotropic liquid crystal material.

11. The display of claim 1 wherein the liquid crystal layer comprises a positive dielectric anisotropic liquid crystal material.

12. The display of claim 1 in which the polarization dependent reflector is closer to the second electrode than the first electrode, and the dielectric layer is between the second electrode and the liquid crystal layer.

13. A display comprising:
   a first substrate;
   a second substrate;
   normally dark pixel circuits between the first and second substrates, each pixel circuit having a transmissive region and a reflective region, each pixel circuit comprising:
     a first electrode;
     a second electrode;
     a liquid crystal layer between the first and second electrodes, the liquid crystal layer having a first portion located at the reflective region and a second portion located at the transmissive region;
     a polarization dependent reflector located at the reflective region; and
     a dielectric layer located at the transmissive region, wherein the dielectric layer has an effective capacitance that is connected in series with an effective capacitance of the liquid crystal layer between the first and second electrodes, the dielectric layer is configured such that when a pixel voltage is applied to the first and second electrodes, the percentage of the pixel voltage applied across the first portion of the liquid crystal layer is higher than the percentage of the pixel voltage applied across the second portion of the liquid crystal layer;
   wherein the dielectric layer and the polarization dependent reflector face the same side of the liquid crystal layer.

14. The display of claim 13 wherein the dielectric layer is configured to cause a gray scale gamma curve of the transmissive region to more closely match a gray scale gamma curve of the reflective region, as compared to the pixel circuit without the dielectric layer.

15. The display of claim 13 in which the polarization dependent reflector is closer to the second electrode than the first electrode, and the dielectric layer is between the second electrode and the liquid crystal layer.

16. The display of claim 13 wherein the liquid crystal layer is between the first and second substrates, and the liquid crystal layer comprises liquid crystal molecules that are substantially aligned along a direction normal to the first and second substrates when no voltage is applied to the first and second electrodes.

17. A transflective display comprising:
- a first linear polarizer having a first transmission axis;
- a second linear polarizer having a second transmission axis, the first linear polarizer located closer to a front side of the display than the second linear polarizer;
- normally dark pixel circuits each comprising:
  - a first electrode;
  - a second electrode;
  - a liquid crystal layer between the first and second linear polarizers, the liquid crystal layer having a first portion between the first and second electrodes and a second portion between the first and second electrodes, the first portion corresponding to a reflective region of the pixel circuit, the second portion corresponding to a transmissive region of the pixel circuit;
  - a storage capacitor to store an electric charge corresponding to a pixel voltage;
  - a polarization dependent reflector that is associated with the first portion of the liquid crystal layer, the polarization dependent reflector to reflect a first component of external light and transmit a second component of the external light, the first component having a first polarization substantially perpendicular to the first transmission axis and the second component having a second polarization substantially parallel to the first transmission axis; and
  - a dielectric layer disposed in the transmissive region of the pixel circuit, the dielectric layer configured between the first and second electrodes such that when the pixel voltage is applied to the first and second electrodes, the percentage of the pixel voltage applied across the first portion of the liquid crystal layer is higher than the percentage of the pixel voltage applied across the second portion of the liquid crystal layer;
  - wherein the dielectric layer and the polarization dependent reflector face the same side of the liquid crystal layer.

18. The display of claim 17 wherein the dielectric layer is configured to cause the transmissive region to have a transmittance-voltage characteristic that more closely matches a reflectance-voltage characteristic of the reflective region, as compared to a pixel circuit that applies the same percentage of the pixel voltage to the first and second portions of the liquid crystal layer.

19. The display of claim 17 wherein the liquid crystal layer is between two substrates, and the liquid crystal layer comprises liquid crystal molecules that are substantially aligned along a direction normal to the substrates when no voltage is applied to the first and second electrodes.

* * * * *